(12) United States Patent
Ghannam et al.

(10) Patent No.: US 6,651,062 B2
(45) Date of Patent: Nov. 18, 2003

(54) METHOD AND APPARATUS FOR MANAGING DATA FOR USE BY DATA APPLICATIONS

(75) Inventors: Jeff Ghannam, Hollis, NH (US); Todd A. Loomis, Exeter, NH (US); Lundy M. Lewis, Mason, NH (US); Utpal Datta, Bedford, NH (US)

(73) Assignee: Aprisma Management Technologies, Portsmouth, NH (US)

( * ) Notice: Subject to any disclaimer, the term of this patent is extended or adjusted under 35 U.S.C. 154(b) by 108 days.

(21) Appl. No.: 09/386,571

(22) Filed: Aug. 31, 1999

(65) Prior Publication Data

US 2002/0188584 A1 Dec. 12, 2002

Related U.S. Application Data

(60) Provisional application No. 60/098,576, filed on Aug. 31, 1998.

(51) Int. Cl.[7] .............................................. G06F 17/30
(52) U.S. Cl. ..................... 707/10; 707/102; 707/200; 709/223
(58) Field of Search ............................. 707/100–104.1, 707/1–10, 200–204; 709/223, 226, 246; 705/3.8

(56) References Cited

U.S. PATENT DOCUMENTS

| | | | | |
|---|---|---|---|---|
| 5,752,246 A | * | 5/1998 | Rogers et al. | 707/10 |
| 5,790,789 A | * | 8/1998 | Suarez | 709/202 |
| 5,995,973 A | * | 11/1999 | Daundenarde | 707/103 |
| 6,058,394 A | * | 5/2000 | Bakow et al. | 707/10 |
| 6,061,724 A | * | 5/2000 | Ries et al. | 709/223 |
| 6,067,542 A | * | 5/2000 | Carino et al. | 707/4 |
| 6,167,405 A | * | 12/2000 | Rosensteel, Jr. et al. | 707/102 |
| 6,308,174 B1 | * | 10/2001 | Hayball et al. | 707/10 |

OTHER PUBLICATIONS

C. Bontempo et al., "The IBM Data Warehouse Architecture", Communications of the Association For Computing Machinery, U.S. Association For Computing Machinery, New York, vol. 41, No. 9, Sep. 1998 (1998–09), pp. 38–51 (XP000791963).

V.J. Anand et al., "Data Warehouse Architecture For DSS Applications," Avis. Australian Journal of Information Systems, AU, Wollongong, vol. 4, No. 1, Sep. 1996 (1996–09), pp. 43–53 (XP002074805).

M.H. Derbyshire, "An Architecture For A Business Data Warehouse," The ICL Systems Journal, GB, International Computers Limited, vol. 11, No. 1, May 1996 (1996–05), pp. 23–47 (XP000631249).

R. Conine, "The Data Warehouse In The Telecommunications Industry," Noms 98, 1998 IEEE Network Operations and Management Symposium, Conference Proceedings (CAT. No. 98CH36158), Noms 98, 1998 IEEE Network Operations and Management Symposium, New Orleans, LA, USA, Feb. 15–20, 1998, pp. 205–209, vol. 1 (XP000799773).

\* cited by examiner

Primary Examiner—Jean R. Homere
Assistant Examiner—Mohammad Ali
(74) Attorney, Agent, or Firm—Paul Coryea

(57) ABSTRACT

A system and method is provided for managing information. Information is aggregated from multiple data sources into a data warehouse wherein the information can be provided to software applications. Disparate information from multiple sources is processed and stored in the data warehouse. Processing may include filtering, collation, compression, and mapping information into database fields of the warehouse. In one aspect, information stored in the warehouse may be network management data.

28 Claims, 14 Drawing Sheets

METHOD AND APPARATUS FOR MANAGING DATA FOR USE BY DATA APPLICATIONS

RELATED APPLICATION

This application claims the benefit under Title 35, U.S.C. §119(e) of co-pending U.S. Provisional Application Serial No. 60/098,576, filed Aug. 31, 1998, entitled "METHOD AND APPARATUS FOR SUPPORTING DISTRIBUTED DATA APPLICATION" by Jeff Ghannam, Todd Loomis, Lundy Lewis and Utpal Datta, the contents of which are incorporated herein by reference.

BACKGROUND OF THE INVENTION

1. Field of the Invention

The present invention relates generally to management of information and, more particularly, to management of data among distributed computer systems.

2. Related Art

Management applications for network, software and/or systems management have become commonplace. Management applications are generally software applications that are executed on standalone computer systems. These management systems provide information regarding one or more entities, such as computers and network communication devices. In particular, these systems gather information from the entities and present them to a network administrator for analysis and interpretation. The network administrator in turn provides corrective actions, configuration changes, and the like to maintain and/or improve network and systems performance. One example of a network management system is SPECTRUM network management system available from Aprisma Management Technologies, Inc. The WinWatch management application available from Metrix, S.A., is an example of a system that provides management for end-user computer systems and servers. Systems Management Server (SMS) available from the Microsoft Corporation provides similar information for managing software and systems.

A recent trend is to manage higher-level entities such as business processes and applications, whereby minimum service levels to users may be maintained. For example, a business process may depend on the performance of one or more other entities, such as another process, a networking device, computer system or other entity that affects the business process. Similarly, an application may be managed wherein the state of the application depends on the status of various software processes, hardware devices, and communications between them. Due to the need for managing business processes and applications, new software applications have been designed to manage them. For example, the NERVECENTER management system available from Seagate, Inc. is an example of a business process management system. The PATROL management application available from BMC Software provides application management functions. Other management systems are available.

Drawbacks of the aforementioned management systems exist. For example, most network management systems need large amounts of storage space on a standalone system. Although the network management system (NMS) may be capable of storing large amounts of data, some data needs to be deleted after reaching a finite level of the standalone system. Thus, long-term data storage is not available, and therefore features which require long-term storage, such as long-term trend analysis, is not possible on these standalone systems.

Also, many different management systems are needed to perform different management tasks. For example, separate systems are generally required for systems and network management. These systems generally collect different types of data, and do not share data between the systems. Also, these separate systems are limited by the types of information that they collect. For example, a network management system generally cannot determine chargebacks to a user based on performance data of a computer system such as a file server.

Data warehouses are a known solution for storing large amounts of data. Data warehouses are generally accessed directly by consumers of its data, and the data is generally loaded manually by database entry personnel. A data warehouse generally refers to an extract of operational data for the purposes of efficient query-only processing. For example, data warehouses are used for storing business-related data such as financial or production information, wherein use of the warehouse facilitates improved decision making. A data warehouse typically contains a wide variety of data that presents a coherent picture of business conditions at a single point in time, and this picture is used for decision support. One such data warehouse product is the ORACLE WAREHOUSE software system available from the Oracle Corporation.

Similar to a data warehouse, a data mart helps one make informed business decisions. Data marts typically contain highly-focused data specific to a department or individual line of business, such as sales, marketing, or finance. Since data marts databases tend to be smaller than that of a data warehouse (data marts are typically under 100 GB in size), data marts are easier to manage and implement.

SUMMARY OF THE INVENTION

According to the present invention, a system is provided for managing information comprising a data manager that accepts data from a plurality of management systems and processes and stores that data in a data warehouse. The data manager comprises an agent configured to accept information from the plurality of systems and which maps the accepted information into database fields of the data warehouse and a database accessor that stores the accepted information in the data warehouse.

In accordance with one embodiment, the agent deletes duplicate data received from more than one source. Also, at least one of the plurality of management systems is a network management system. In one embodiment, the database accessor utilizes a standard database interface to one or more proprietary data warehouses. In another aspect, the agent is a push agent configured to push data to the database accessor at a specified interval. In another aspect, the agent is a pulling agent configured to pull one or more systems for obtaining management data and provides the management data to the database accessor. In another aspect, the one or more systems are network management systems. In yet another aspect, the network management systems store different types of management information in network management databases.

In one aspect, the system can determine and control how much information is to be stored in a local database. A filtering and scheduling interface allows users to decide what types of information they wish to replicate to the data warehouse and how often. In one embodiment, a standard database interface is provided to maintain independence from the underlying proprietary database. In one aspect, the database interface is a CORBA interface. In another embodiment of the invention, the data warehouse stores object-oriented objects.

In another aspect, system is provided for management of network data. Network data is aggregated from multiple data sources into the data warehouse, wherein the data can be provided to software applications. The system integrates disparate data sources into the data warehouse by for example, performing data filtering, collation, compression, and mapping the data into database fields of the data warehouse.

Advantageously, this system provides consolidated information to applications that can perform high-level analysis. Because information is stored in the data warehouse and a standard interface is provided to access the warehouse, a consistent, reusable set of services for obtaining management data is available. In one aspect, the system is capable of tracking trends and changes in network devices and software models of the devices. For example, a network accounting application can integrate usage data from different network managers and devices and network probe information, allowing a user to see a consolidated graph or billing statement. In one embodiment, the system can trend business processes, showing over time which processes have failed most often and what components have caused those failures. Further, in yet another embodiment, the system can determine chargebacks for users consuming network resources, such as bandwidth.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numeral identifies the drawing in which the reference numeral first appears.

DETAILED DESCRIPTION

Figure 1:
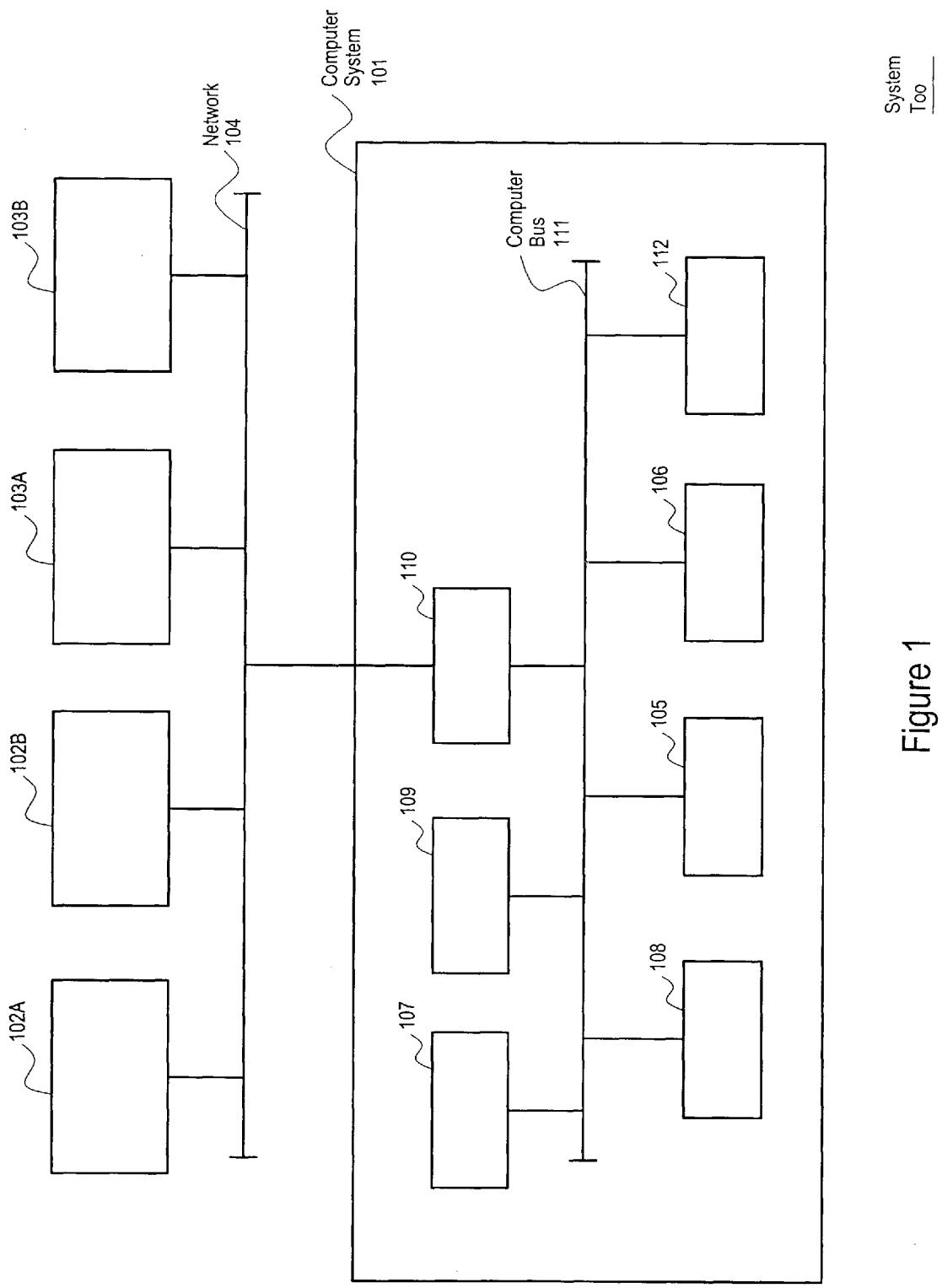
FIG. 1 is a block diagram of a computer system suitable for incorporating an embodiment of the present invention.

An exemplary network system wherein the data management system of the present invention may be implemented is illustrated in FIG. 1. The exemplary network system 100 includes a plurality of management systems 102A–B interconnected through network 104. Network 104 may be, for example, a local area network (LAN), metropolitan area network (MAN), wide area network (WAN), etc., or other network used to communicate information between systems. Network 104 may also include one or more managed entities 103A–B that may be managed by management systems 102A–B, such as an end-user computer, network server, router, switch, application, process or other manageable entity. Network 104 may contain any combination of management systems and managed entities.

An exemplary computer system implementing the data management system of the present invention is shown in FIG. 1 as item 101. Computer system 101 may be a general purpose computer system, which typically includes a processor 105 connected to a memory system 106 via an interconnection mechanism such as a computer bus 111. Input/output (I/O) devices 107, 108 such as disk controllers, graphics cards, or the like may be included in computer system 101. The computer is capable of executing an operating system and is generally programmable by using a high level computer programming language such as the C++ programming language.

Computer system 101 includes a software program stored in memory system 106, which causes the processor to perform operations of data management system 210. As will be described in more detail below, data management system 210 receives information from one or more data sources, processes the information according to policies, and stores the information in a data warehouse. The data warehouse can be accessed by applications that perform analysis with the data.

The general purpose computer system 101 preferably includes a commercially available processor 105, such as the Celeron, Pentium, Pentium II or Pentium III microprocessor from Intel Corporation, PowerPC microprocessor, SPARC processor, PA-RISC processor or 68000 Series microprocessor from Motorola. Many other processors are also available. Such a processor generally includes an operating system which may be, for example, DOS, Windows 95, Windows 98, Windows NT, or Windows 2000 operating systems from the Microsoft Corporation, the System 7.X operating systems from Apple Computer, the Solaris operating system from Sun Microsystems, the Unix operating system and its variants available from many vendors including Sun Microsystems, Inc., Hewlett Packard, Red Hat Computing and AT&T, or the NetWare operating system available from Novell, Inc.

The operating system controls the execution of other computer programs and provides scheduling, debugging, input/output control, accounting, computation, storage assignment, data management, memory management, communication control and related services. Processor 105 and an operating system define a computer platform for which application programs and high-level programming languages are written. Management system 102 may be any type of computer system as described above, with a network interface card (NIC) or other communication device installed to communicate over network 104.

The operating system interfaces with firmware and hardware of system 101 in a well-known manner to access I/O devices 107, 108 and memory system 106. Memory system 106 may be any commonly available random access memory (RAM) or read-only memory (ROM), a hard drive, CD ROM, tape system, or the like used to store and/or retrieve data.

The data management system 210 of the present invention is preferably implemented in C++, however, it may be implemented in any other well-known software language. For example, the data management system 210 may be implemented in interpreted object-orientated programming language, such as JAVA, ActiveX, or SmallTalk. System 210 may also be configured to execute within a browser application, such as the Netscape Navigator browser available from Netscape, Inc. or the Microsoft Internet Explorer browser available from Microsoft. Alternatively, data management system 210 may operate as a computer implemented process accessible through a browser interface. Furthermore, data management system 210 is capable of residing on any well-known computing platform.

Software techniques for performing data management functions in accordance with the present invention typically reside in memory 106 and may be stored on a computer-readable medium such as, for example, magnetic disk, compact disk, magnetic tape, or optical media. A software embodiment of the present invention may be, for example, loaded into computer system 101 using an appropriate peripheral device as known in the art. Alternatively, software implementing another embodiment of the present invention may be stored, for example, on a server located in network 104, and installed or executed over network 104. It should be understood, however, that the present invention is not limited to a particular computer platform, particular operating system, or particular processor. The exemplary environments identified above are given by way of example only; the invention may be implemented in a variety of computer systems having a variety of system architectures.

Figure 2:
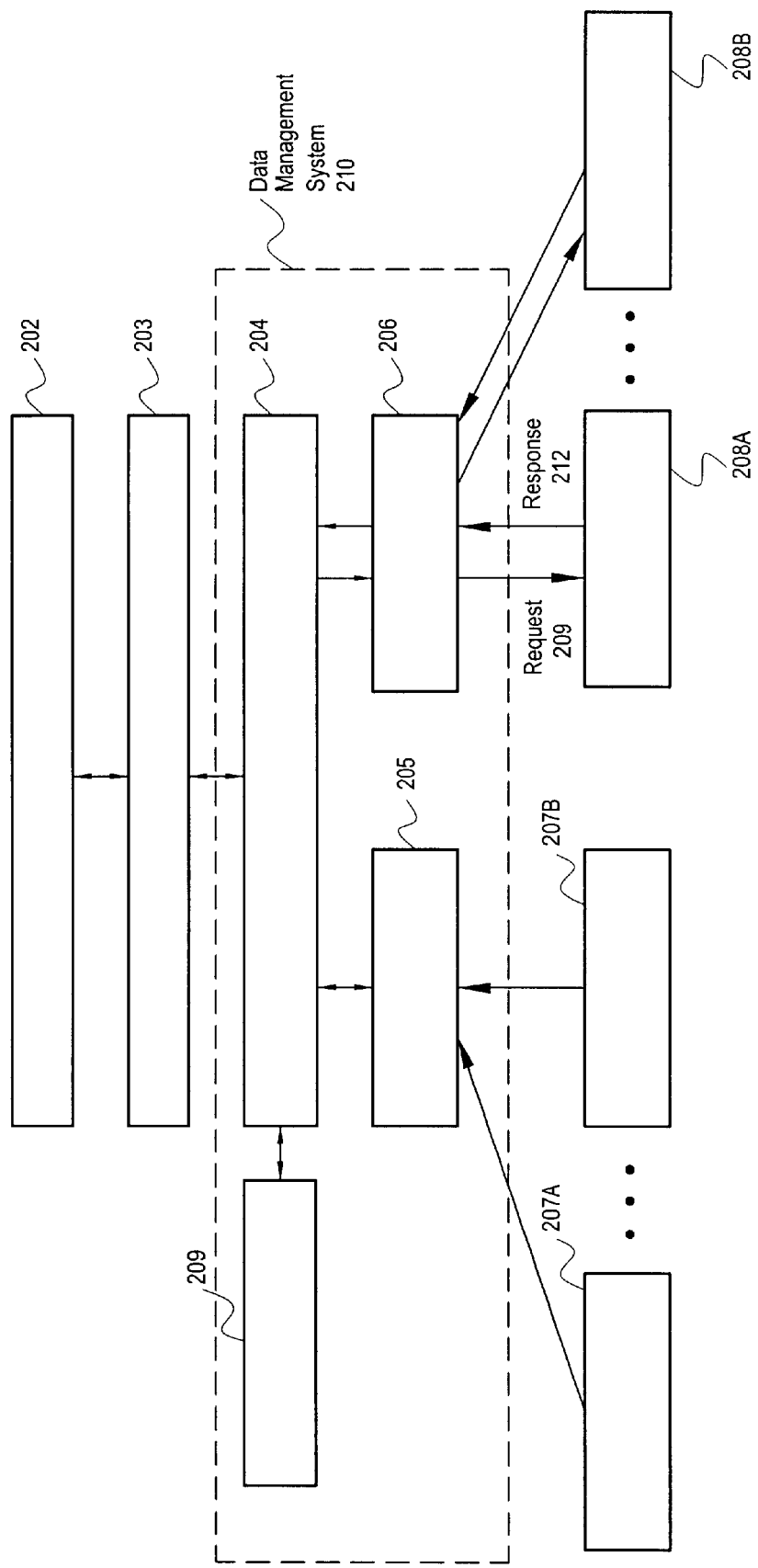
FIG. 2 is a block diagram depicting a system incorporating an embodiment of the present invention.

FIG. 2 shows a block diagram depicting a system in accordance with one embodiment of the present invention. Database management system 210 receives information from one or more data sources 207A–B, 208A–B and stores the information in a data warehouse 203, whereby software applications 202 may access and perform analysis on the stored data, and provide analysis results to a user.

Data management system 210 may include a database accessor 204 which provides an interface to the data warehouse for managing and storing information in the data warehouse 203. Database accessor 204 may use one or more database policies 209 to determine when information is to be sent to the data warehouse 203. Database policy 209 may also specify a source of the data and the frequency by which data should be obtained from the data source.

System 210 also includes agents 205,206 which provide the ability to interface to other systems, extract data from them, and map the data into the data warehouse 203. A push agent 205 is used to push unsolicited data from data sources 207A and 207B into warehouse 203. Data which can be pushed includes information types that are regularly stored in the data warehouse at regular intervals. For example, a network management station may, after a two week period, push data collected that is more than two weeks old to database accessor 204. Push agent 205 may reside on a computer system that includes management system 210, or the push agent 205 may be located on a computer system such as a network management system. According to one embodiment, the push agent 205 has access to a management system database located on the network management, and provides information from that database to database accessor 204 for storage in data warehouse 203.

In contrast, system 210 may include a polling agent 206, which performs requests 201 to data sources 208A–B and receives responses 212. Agent 206 may be used to obtain data from sources at specified intervals. By contrast, an external system controls the loading of data into the warehouse using push agents. Polling agent 206 may include a polling manager, which allows for scheduling and configuring of polling requests. Polling may be performed according to database policies 209, which may include as parameters system locations, types and frequencies of the data that is obtained. It should be understood that system 210 may perform any method for obtaining data, such as polling, received pushed data, or any other method.

Data warehouse 203 may be, for example, a commercially available data warehouse product, such as ORACLE WAREHOUSE available from the Oracle Corporation. Data warehouse products from other companies including Microsoft, Sybase, and Informix and others may also be used. Other types of data warehouses may be used. Alternatively, a distributed data warehouse or data marts may be used to store and serve data.

Figure 3:
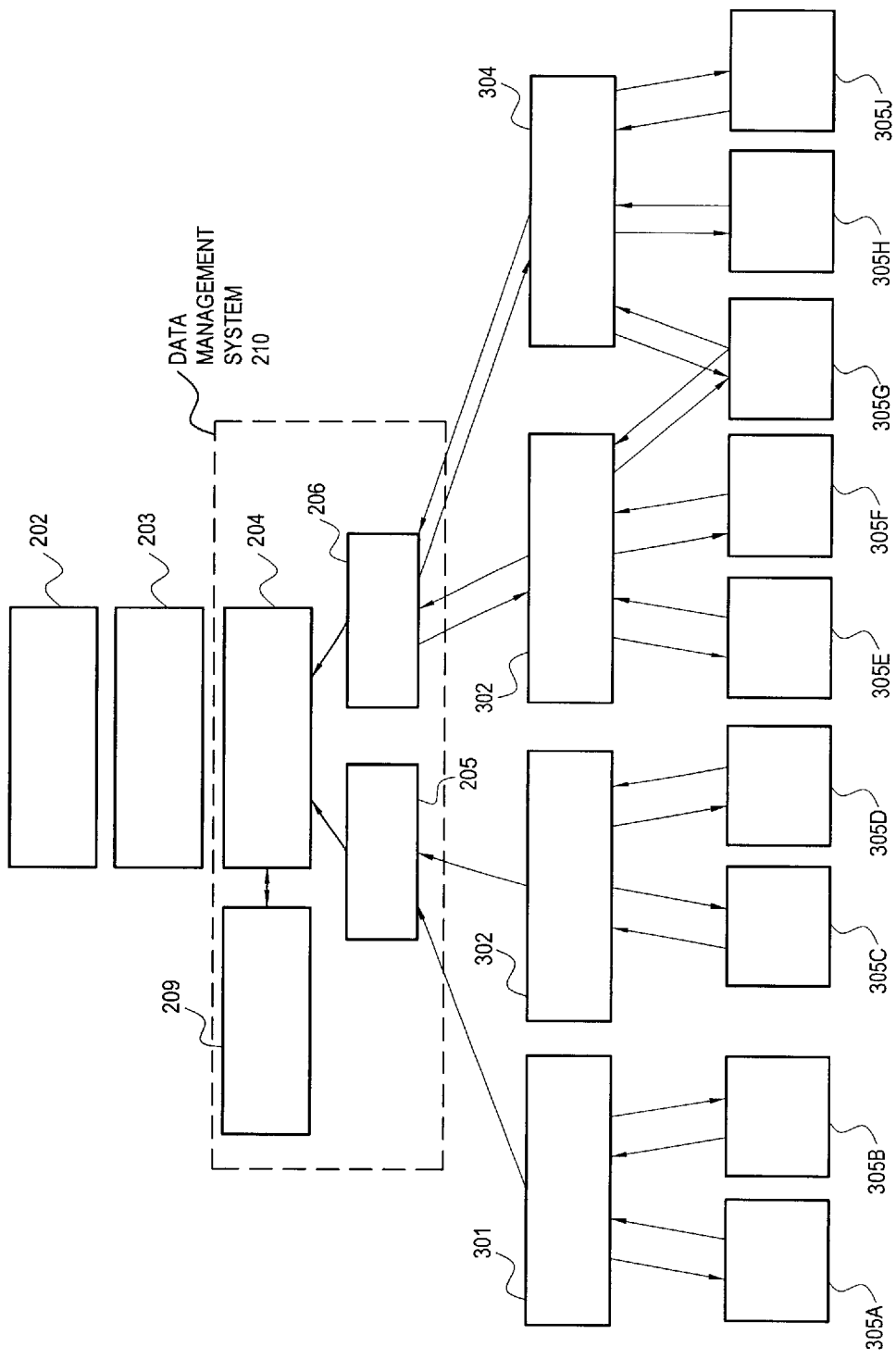
FIG. 3 is a block diagram depicting another system incorporating an embodiment of the present invention.

Data sources may be, for example, management servers, network entities or any other source of management data. The term "data" and "information" are used synonymously in this application, and can be used interchangeably. FIG. 3 shows a block diagram of a system wherein multiple management systems 301–304 transmit data to data management system 210. Data may be transmitted through a communications network such as a LAN, or through any method available. If a management system is located on the same computer system as system 210, data may be transferred through common file structures, interprocess communication, or by any manner available.

Management systems 301–304 may be the same type of management system, such as a network management system, or they may be different. Management systems 301–304 may store similar or dissimilar types of data. Management systems 301–304 obtain information from network entities 305A–J, either by polling or receiving pushed data. Such information may include configuration data, performance data, or any data which is relevant to the operation and control of the network entity 305.

For example, a network entity 305A may be a router, and management system 301 may be, for example, a SpectroSERVER network management system available from Aprisma Management Technologies, Inc., Portsmouth, N.H., U.S.A. Router 305A may send unsolicited messages, commonly referred to as traps, to management system 301, the traps indicating an operational state of network entity 305A. Further, management system 301 may obtain information from router 305A by polling the device through a network management protocol, such as SNMP (simple network management protocol). Received information may be stored by system 210 in data warehouse 203. It should be understood that any method for communicating information may be used.

Data management system 210 may perform processing on received data including filtering, collating, compression, and mapping data into database fields of the data warehouse 203. For example, when a trap is received by a management system of a network entity, and is passed on to an agent 205, 206, some of the data fields of the trap may not be needed by application 202. Therefore, unnecessary data may be deleted. Further, management systems 301–304 may not be the same type of management system, and therefore data formats represented in the management systems 301–304 may need to be mapped to a common database format by the database accessor 204. Further, data received from data sources may be compressed by the database accessor 204 prior to storing the data in data warehouse 203 such that database space is conserved.

More than one management system may also collect information about a particular network entity. For example, management systems 303 and 304 may both collect the same or overlapping information from network entity 305G. Data management system 210 may delete redundant information before storing it in the data warehouse 203.

Information that is stored in the data warehouse may include event or trap information, topology data, configuration data, network object data, performance data or any other data regarding computer systems management. For example, the data sources may include management systems such as the SpectroSERVER available from Aprisma Management Technologies, Inc., which manages LANs, WANs, SNA networks, and other types of networks. Another data source may include the SPECTRUM SecureFast Flow Admission Server (FAS) and SecureFast VLAN manager which are Aprisma Management Technologies, Inc. management systems that manage Aprisma Management Technologies, Inc.'s SecureFast packet switches and cell switch networks. Further, another data source may include Aprisma Management Technologies, Inc.'s SecureFast Virtual Remote Access management system (SF VRA) which provides information regarding remote access of users to a network. Further, other sources including BMC PATROL, Metric WinWatch, and Microsoft SMS discussed above may be sources or users of data. Also, telecommunications management network (TMN) and their communication devices may also provide data to be stored in data warehouse 203. It should be understood that many different sources of data may be used, and this list is not exhaustive or limiting.

Access to the data warehouse 203 may be provided through standard database interfaces such as SQL, ODBC, and CORBA interfaces. Data warehouse 203 may be thought of as a single physical database, or a single virtual database comprising individual physical databases distributed geographically throughout network 104. Because data is stored in a single repository, it is now possible for applications 202 to access a larger set of data types than previously possible. For example, a networking accounting application can combine usage data from SPECTRUM, SecureFast FAS, SecureFast VRA and RMON network management systems. This capability allows the user to see usage for multiple network media types including traditional LAN, virtual LAN, ATM and remote access. Conventionally, an analysis of this type would require four views, or worse yet, four different applications to obtain information from the four different management systems. Unlike conventional systems, management system 210 provides a single source of information in data warehouse 203.

Figure 4:
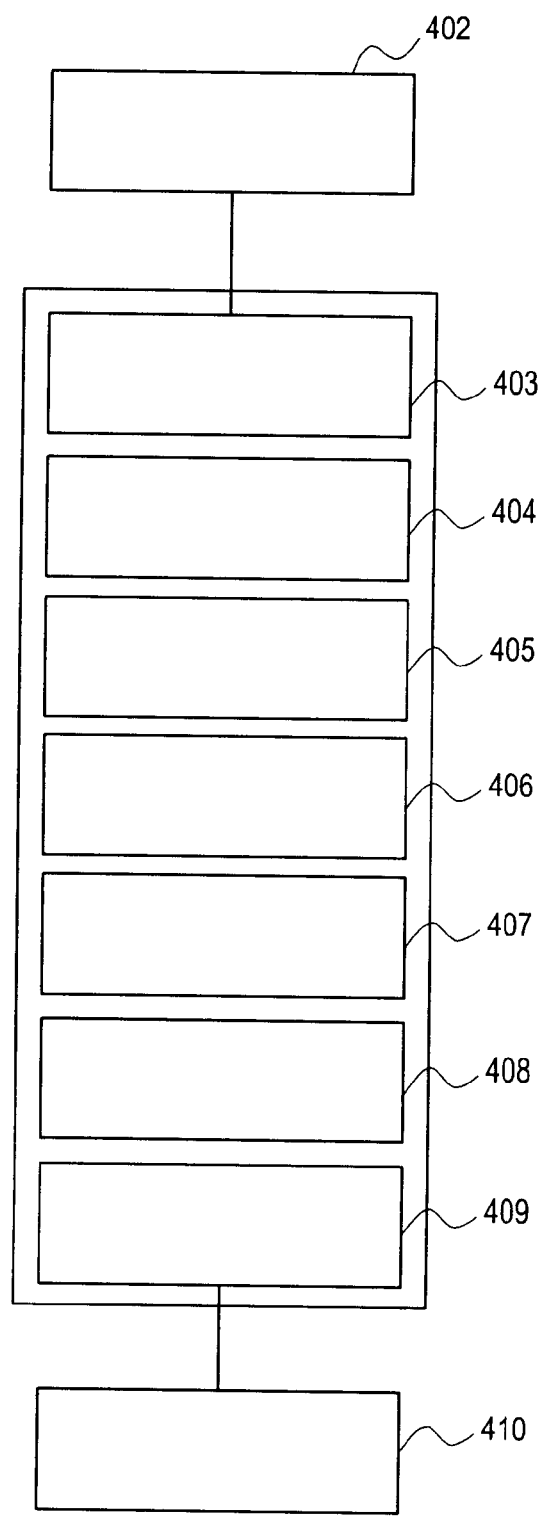
FIG. 4 is a block diagram depicting a layered view of a system providing information to data users from one or more data providers in accordance with one embodiment of the invention.

FIG. 4 depicts a layered view of a system providing information to data users from one or more data providers in accordance with one embodiment of the invention. In this embodiment, each layer has specific responsibilities and may be constructed using object-oriented programming. Data user 402 is a consumer of data produced by data provider 410. Data provider 410 may include one or more agents such as a pull or push agent discussed above with reference to FIGS. 2 and 3. Data providers 410 may provide statistical, event, model, and call record data. Data provider 410 may provide other types of data. Data user 402 may be, for example, an application 202 such as a capacity planning, billing, accounting application, or the like.

Interface layers 403 and 409 provide an external interface to data users 402 and providers 410, respectively. Interface layers 403,409 include, in an object-oriented environment, interface objects. An interface object represents an encapsulation of business concepts not specific to a particular application. For example, data management system 210 provides interface objects for statistics, topology, and call records data, but, according to one embodiment, interface objects are not based on applications 202. By abstracting objects based on business concepts, the complexity of system 210 is reduced. For example, a method which obtains call records could be used for both capacity planning and a billing application.

In one embodiment, interface objects manage the creation and deletion of business objects which encapsulate business rules for a given topic into a class structure. For example, a business object called "topology" contains business rules for obtaining topology data from the data warehouse 203, to include the structure of the data in the database, any error checking of the data, and any data dependency checking. Further, interface objects may map client application requests to an appropriate business object within business object layers 404, 408 that will perform the service. Also, interface objects may perform error recovery functions in the event that a client's communication disconnects due to error, or catch exceptions "thrown" or generated by business objects and provide handling of exceptions and status messages to the calling client objects. In general, client interface objects provide transaction management for each service they provide. If an exception occurs during the processing of a service, the interface object will ensure changes are rolled back prior to passing the exception to the calling client object. Interface objects may also utilize a security object to provide transaction-level security.

Business object layers 404,408 may include two types of business objects, one which extracts data from the data warehouse and provides it to client applications, and another for exporting data. Business objects may be C++ objects which do not need interface object functionality for communicating with data users and data providers.

Business objects extract data from the data warehouse, and include functional components which support different applications 202. For example, business objects may include objects providing statistical, landscape, and call record data in support of capacity planning and billing and accounting applications. Higher levels of business objects such as a decision support object may in turn rely on capacity planning and accounting information, which are subsequently reliant on underlying statistical, landscape and call record data.

Statistical objects may provide the ability of client programs to obtain various sets of data associated with performance statistics associated with a customer or model. For example, a statistics object may contain a method which, when invoked, obtains attributes and values for a given time period for one or more models. Further, statistical objects may obtain statistics for a given customer or user.

Landscape objects may provide the ability for applications 202 to obtain information about a network domain and its entities. For example, methods in a landscape object may allow an application 202 to obtain all of the model types in a given category. Further, the object may support obtaining basic information for all landscapes in the data warehouse, which contain one or more model categories. A landscape object method may obtain data that allows a graphical rendering of a network topology of one or more domains. Also, a landscape object may support retrieving basic information on models within a landscape in the data warehouse.

Call record data objects may provide the ability to provide call record data for a given customer. It should be understood that other object types could be used, and system 210 is not limited to the objects described above.

Business objects may use standard C++ exception handling to handle exceptions, and may have the capability of catching exceptions that they are capable of handling, or allow the exception to be propagated to interface objects. In one embodiment, interface objects pass exceptions to client applications 202 using Corba exception handling, which is well-known.

Database access layers 405, 407 contain object-oriented class structures which, in one embodiment, provide a vendor-independent database interface to business objects. Database access objects provide connection management functions such as connection and disconnection from data warehouse 203, which is represented by a physical database 406. Physical database 406 as discussed above, may be a commercially available database such as the ORACLE WAREHOUSE software system implemented as software executing on a computer system. Database access layers may by implemented by a commercially-available programming product such as Pro-C or Oracle Call Interface (OCI) available from the Oracle Corporation. It should be understood that other database interfaces may be used to allow business objects to access data in data warehouse 203. In sum, the database access objects provide a wrapping function between a business object and a conventional interface of the data warehouse 203.

Figure 5:
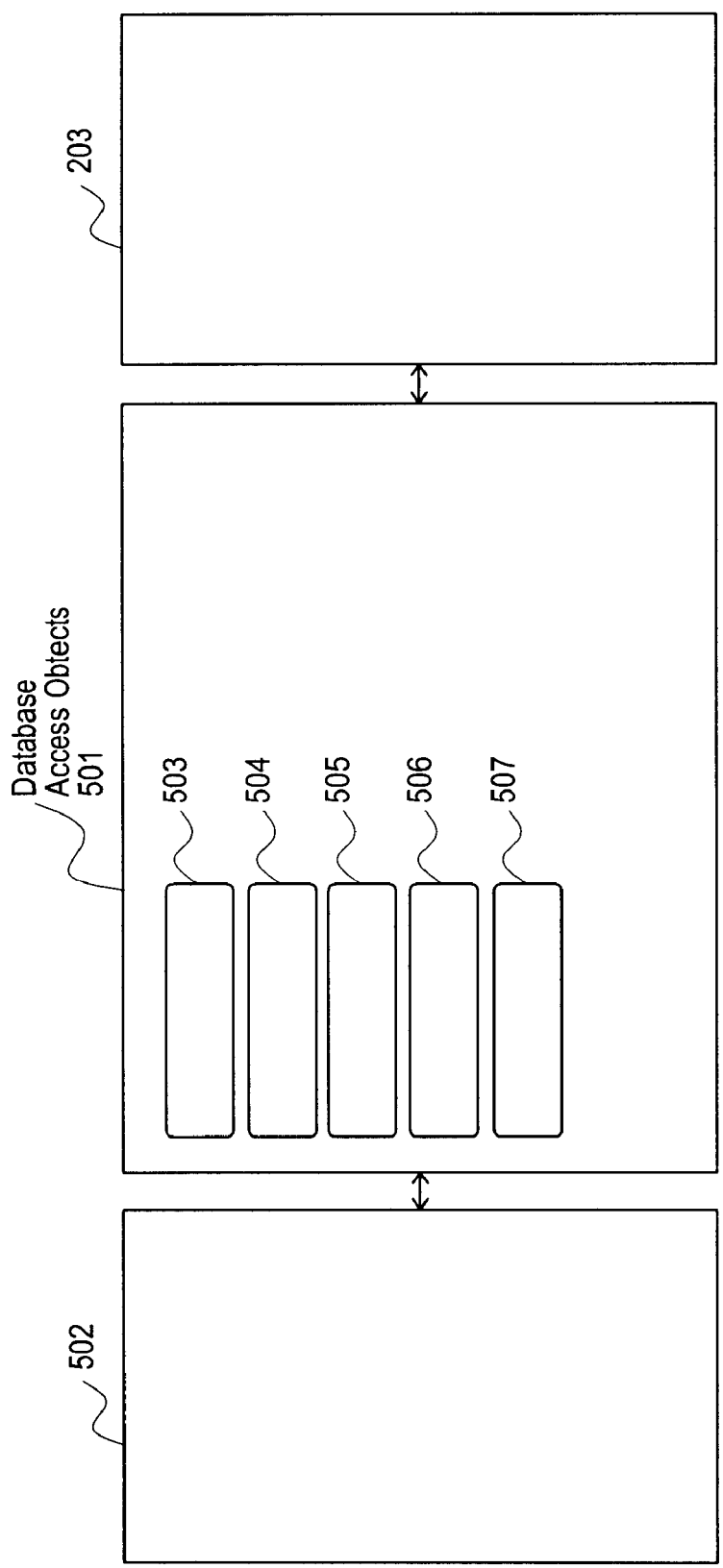
FIG. 5 is a block diagram of objects of a data management system in accordance with one embodiment of the invention.

Such functions may include the set attributes, set tables, set clauses, submit query, and submit procedure functions as shown in FIG. 5. The database access objects 501 map requests from business objects 502 into database actions to be performed on the data warehouse 203. The set attributes function 503 set attributes for a particular database table. The set tables function 504 allows a user or process to specify a table upon which operations can be performed. The set clauses function 505 allows a user or process to create a search clause which specifies a search query. The submit query function 506 allows a user or process to submit a database query. The submit procedure function 507 allows a user or process to submit a query for batch processing.

Figure 6:
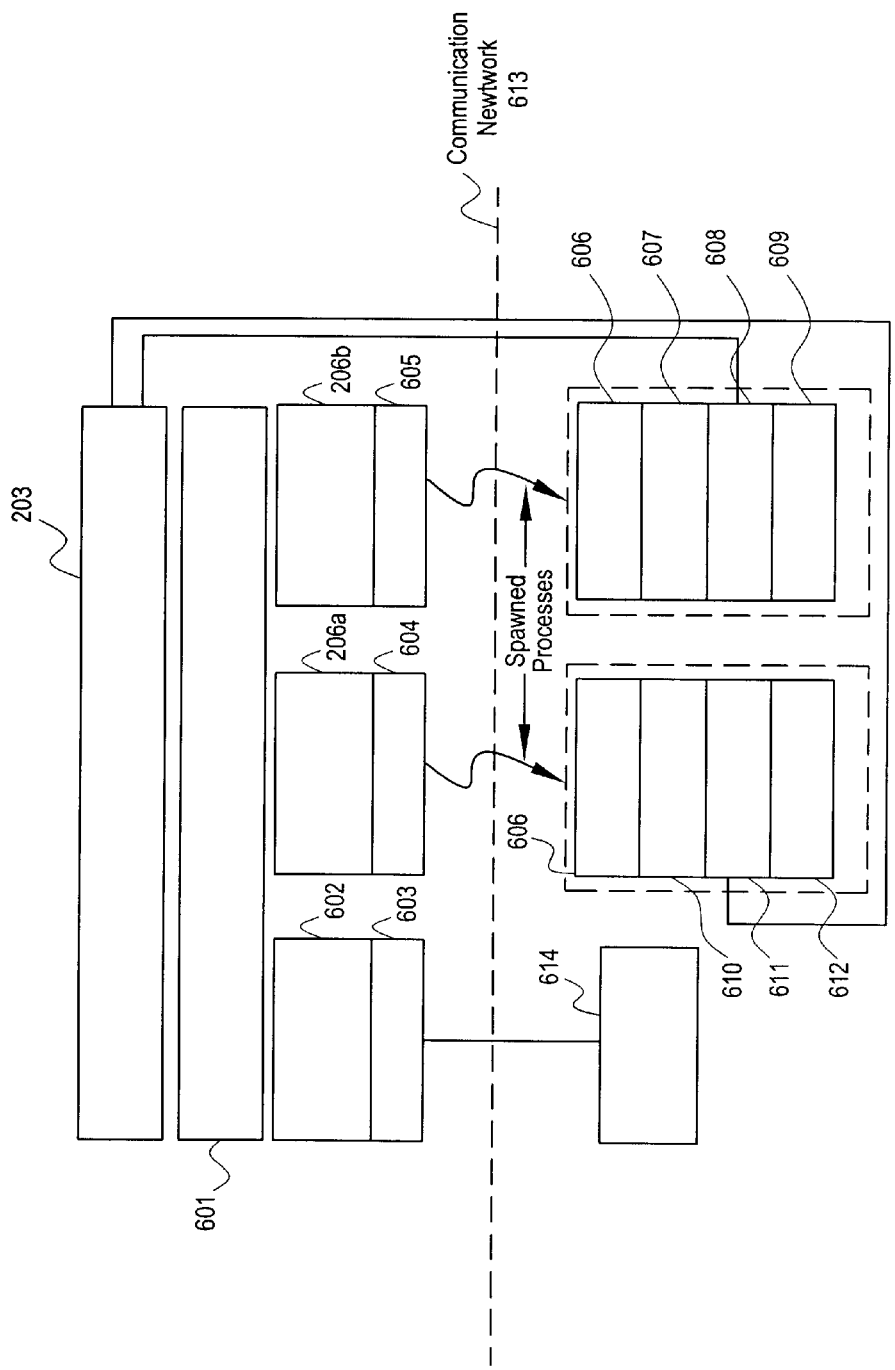
FIG. 6 is a block diagram of a data management system and an agent in accordance with one embodiment of the invention.

As discussed above with reference to FIGS. 2 and 3, a number of agents provide the ability to interface with other systems. As shown in FIG. 6, there may be agents which are suited for the data which they collect, or suited to the management system from which they obtain data. Data management system 210 may include a VLAN agent 602 which is an example of a push agent. Model agent 610 and Statistics and Event agent 607 are examples of polling agents. VLAN agent 602 is responsible for storing VLAN call record data in data warehouse 203. VLAN agent 602 provides an interface object 603 which provides methods for placing data in data warehouse 203. The VLAN agent calls methods on one or more database access objects 601 to store data in data warehouse 203.

Statistics and Events agent 607 is responsible for reading statistics and events data from a management system such as Aprisma Management Technologies, Inc.'s SpectroSERVER network management system. Polling agent 206B will collect data from the management system specified by database policies 209. Agent 206B will perform data mapping, reduction and collation operations, and call methods of a database access objects 601 to store data in warehouse 203. Dispatcher/collator 609 will control access to data on the network management system.

Model agent 610 is responsible for reading landscape and topology data from a network manager such as a SpectroSERVER network management system. In the case of accessing a SpectroSERVER, the model agent may use the well-known Spectrum API (SAPI) to access each SpectroSERVER. The model agent 610 collects data from the SpectroSERVER for a time period specified in the database policies 209, and calls methods of database access objects to store data in warehouse 203. In one embodiment, agents 610 and 607 reside on a SpectroSERVER management system. Further, communication with agents 610, 607 may be performed through CORBA interfaces 606 called through interface objects 604, 605, respectively.

Figure 7:
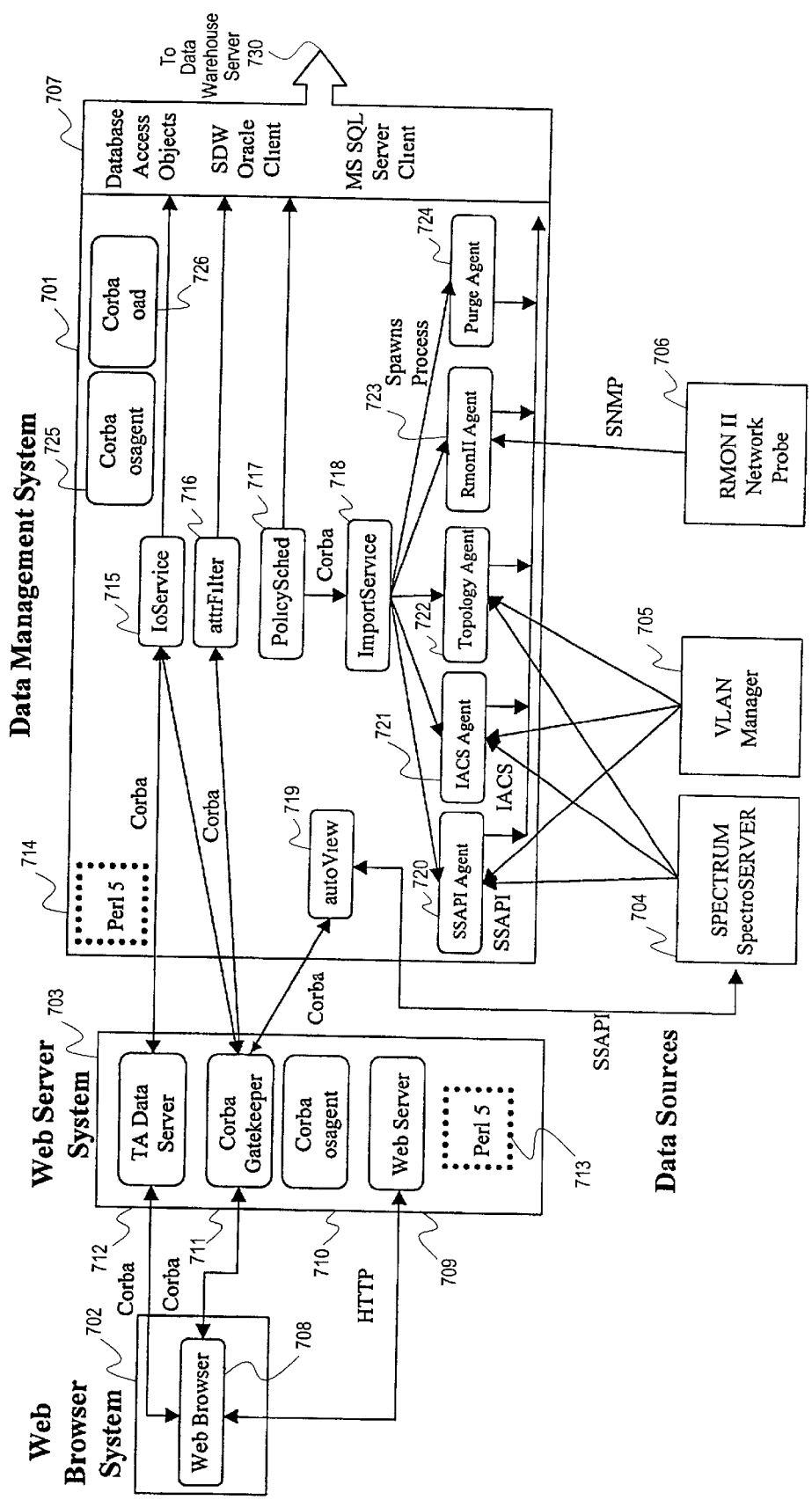
FIG. 7 is a block diagram of a data management system and an agent in accordance with one embodiment of the invention.

FIG. 7 shows one embodiment of a system using management systems from Aprisma Management Technologies, Inc. In this embodiment, data management system 701 obtains information from data sources Spectrum SpectroSERVER 704, VLAN Manager 705, and RMON II network probe 706 systems. System 701 stores the information in a data warehouse 203 which is located on a data warehouse server 730 in network 104 (shown by arrow at right side of FIG. 7, with regard to network 104 of FIG. 1). System 701 utilizes database objects 707 to store information. These objects 707 may be, for example, provided as client software such as the Software Data Warehouse (SDW) client, available from Oracle, or a Structured Query Language (SQL) client available from Microsoft. It should be understood that any method for accessing data warehouse 730 may be used. As discussed above, data warehouse 203 may be an Oracle or Microsoft data warehouse product. Operation of various components will be discussed more specifically below in reference to pseudocode according to various embodiments. System 701 includes SSAPI agent 720 which collects object data from SpectroSERVER 704 and VLAN Manager 705 using the SSAPI programming interface. IACS agent 721 collects events and statistics data from both SpectroSERVER 704 and VLAN Manager 705 systems. In addition, Topology Agent 722 collects information pertinent to determining topology from systems 704, 705. System 701 may also include an RMON II Agent 723 for collecting remote monitoring data from one or more RMON probes 706. Purge Agent 724 may be a process, which periodically purges data from one or more databases. Agents 720–724 may be processes spawned in memory of a computer system by ImportService 718 which controls importing of data into data warehouse 203. ImportService 718 imports data based on policies, which are managed by PolicySched 717. PolicySched 717 reviews stored policies and triggers the collection of data by agents 720–724. Data management system 701 also includes a scripting service such as Perl5 714 to issue command line scripts discussed in more detail below with respect to import of data. Further, system 701 includes CORBA osagent 725 and CORBA oad 726 which facilitate CORBA communications between system 701 and other CORBA-enabled systems as is known in the art.

Information and configuration of system 701 is presented to a network user through a web browser 708 of web browser system 702. Web browser 708 may access a data server TA Data Server on a web server system 703 which controls access to data warehouse data through IoService 715. Information may be served to web browser 708 by web server 709 in a standard manner using the well-known HTTP communication protocol. In one embodiment, object data may be communicated using CORBA. Web server system 703 also includes a CORBA osagent 710 and scripting service Perl5 (713) to facilitate displaying data and the executing functions.

Figure 8:
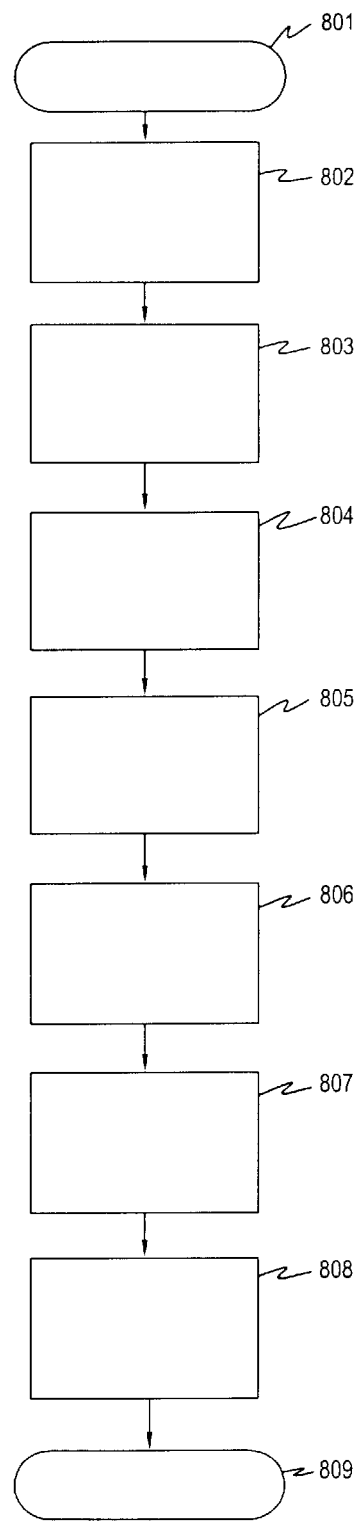
FIG. 8 is a flow chart depicting the import of model data into a data warehouse.

FIG. 8 is a flow chart depicting the overall process 800 for importing data into data warehouse 203. At step 801, process 800 begins. At step 802, data management system 210 verifies database information, such as a database version and layout of the database described by a database schema. At step 803, system 210 spawns an agent process to collect information from data sources 207–208 according to database policies 209 (see FIG. 2). Database policies may be stored local to system 210 as well as in data warehouse 203. At step 804, system 210 constructs a list of policies to be executed on one or more data sources 207–208. At step 805, system 210 queries a database of data sources for data source information. This database of data sources may be stored in data warehouse 203 or in memory of system 210. Data warehouse 203 may be maintained by a data warehouse server system 730. System 210 queries the database for policies specified by the list of policies at step 806. At step 807, system 210 creates a final list of database policies to be executed by merging a local list of policies with that stored in database 203. At step 808, the database policies are executed by one or more agents 205, 206, and information is collected from data sources 207–208. At step 809, process 800 ends.

The following sections which refer to FIG. 7 describe example imports of various types of management data in accordance with several embodiments of the invention:

1. Overall Models Import Flow (SSAPIAgent)
   A. Data management system 701 performs software/schema version check by:
      I. Connecting to the data warehouse 203 through database access objects 707.
      II. Issuing a query to the data warehouse 203 database to retrieve the schema version.
      III. Disconnecting from the data warehouse database 730.
   B. SSAPI Agent 720 is started with a list of policy IDs that are models imports to complete.
   C. A detailed list of the policies to be executed is constructed.
   D. A query is issued to the database (cs_agent_name) of data warehouse 203 to retrieve export_type (the type of data source), agent_name (the machine name of the data source), and exec_constraint (the constraints for querying the data source).
   E. A query is issued to a database of policy (cs_export_policy) to retrieve the list of policies specified on the command line.
   F. The tables are joined internally to create a final detailed list of policies to be executed.
   G. Each of the policies are executed in an order, such as in serial order.
      I. An update is issued to the database of policies (cs_export_policy) to set the status field of the import to "running".
      II. SSAPI agent 720 connects and sends a log message to IoService 715 indicating that the import has started.
         a. IoService 715 performs a single insert into cs_log_message to save the log message.
      III. An update is issued to the database (cs_export_policy) to set the start_time of the import to the current time.
      IV. A list of subimports is constructed (relation, model, model_type, attribute, association) corresponding to subgroups of information to be stored in warehouse 203.
      V. Each of the subimports is executed serially
         a. If an error occurs during a subimport, no further subimports are done for this policy.
      VI. An update is issued to the database (cs_export_policy) to set the end_time of the import to the current time.
      VII. An update is issued to the database (cs_export_policy) to set the status field of the import to "sleeping".
      VIII. The agent 720 connects and sends a log message to IoService 715 indicating that the import has completed.
         a. IoService 715 performs a single insert into cs_log message.
   G. Once all policies have been executed:
      I. If any new models were imported OR active models changed IP, MAC, OR name OR models were terminated then:
         a. Execute a stored procedure called CS_SCHEMA_STATS to reoptimize the schema for queries.
         b. Run a script called load_dim.sql to rebuild/update tables storing information regarding links and attributes of the network entities: cs_attribute_dimension, cs_generic_attribute, cs_attr_genattr_link, cs_mt_category_link, cs_model_dimension, cs_Category_genattr_link.
      II. If any new associations have been imported OR any old associations were terminated then
         a. Execute a stored procedure called CS_SDW_UPDTOPO to update the cs_topology table.

2. Relations Import Flow
   A. Connects to SpectroSERVER 704 using synchronous SSAPI.
   B. Retrieves a mapping called VL Map from the SpectroSERVER 704 to obtain the landscape handle of the server which is used to uniquely identify the landscape.
   C. Connects to the database 203 and retrieves a list of relations between network entities from the cs_relation table.
   D. Retrieves a list of relations in SpectroSERVER 704 via an SSAPI call.
   E. Compares the list of relations from SpectroSERVER 704 to the list of relations from the database 203, making a list of all new relations.
   F. Inserts all new relations into cs_relation using a database insert statement.
   G. Disconnects from the SpectroSERVER 704.
   H. Disconnects from the database 203.

3. Model Import Flow
   A. Connects to the SpectroSERVER 704 using synchronous SSAPI.
   B. Retrieves the VL Map from the SpectroSERVER 704 to obtain the landscape handle of the server.
   C. Connects to database 203 and truncates cs_temp_model.
   D. Retrieves a list of all models that represent network entities in the network from the SpectroSERVER via an SSAPI call
   E. Loops through the list of models
      I. Issues a SSAPI query for IP address, MAC address, and model creation time of the current model
      II. If the model is a VLAN model of type VLANLink then:
         a. Issue a SSAPI query for the model address (or the model name) otherwise the model name in the model description is used.

III. Adds the information about this model to a list.

IV. If the list of model information is greater than 1000 models long then:
  a. Insert the current list of models into cs_temp_model
  b. Empty the current list of models F. Perform a final insert into the cs_temp_model table to write the remaining records into the database.

G. Lock the cs_model table to prevent updates by other agents.

H. In a query, terminate all models in cs_model that are not in cs_temp_model.

I. In a query, for all active models in cs_model, update the model name, IP address, and MAC address if they have changed between the prior import and the current one.

J. In a query, add all new models to the cs_model table.

K. Commit the three transactions H, I, and J above, unlocking the cs_model table.

L. Bind stored procedures to prepare for use.

M. Retrieve a list of all models in the SpectroSERVER via on SSAPI call.

N. Loop through the list of models
  I. Retrieve a list of all logged attributes for the current model via an SSAPI call.
  II. Attempt to look up the SDW model handle by the following algorithm:

```
if (spectrum_model_handle = last one encountered)
{
model_handle = last one determined;
}
else
{
SDW DATABASE: lock CS_Model to all other updates;
  SDW DATABASE: search for CS_Model entry with given Spectrum
  model handle,
  either active, or inactive with time_stamp within model start/end times
  if (Spectrum model matches an inactive entry in SDW)
  {
  model is inactive - model_handle = existing SDW model key
  }
  else -- Spectrum model not found in SDW, or an active match is found
  {
  SPECTRUM: get model data from SpectroSERVER via a SSAPI call;
  if (model is in SDW and is active)
  {
  if (model is not in SPECTRUM or
  (model is in SPECTRUM but differs from that in SDW,
  i.e. different model type or creation time))
  {
  SDW DATABASE: deactivate model in SDW
  (i.e. update end_time_key = now);
  }
  }
  if (no active model in SDW and present in SPECTRUM)
  {
  SDW DATABASE: create model in SDW
  (i.e. insert new CS_Model row with new SDW model key
  and info just read via SSAPI);
  model_handle = newly created SDW model key;
  }
  }
SDW DATABASE: unlock CS_Model;
}
``` return model_handle;
  III. For each logged attribute ID defined for the current model, add the model handle, attribute ID, polling interval and logging interval to a list IV. If the list is has greater than or equal to 1000 entries in it, then
    a. Insert the records into the cs_model_attribute table in one insert
    b. Empty out the current list O. Insert the remaining records into the cs_model_attribute table P. Disconnect from the SpectroSERVER 704.

4. Model Type Import Flow

A. Connect to the SpectroServer using synchronous SSAPI

B. Retrieve the VL Map from SpectroSERVER 704 to obtain the landscape handle of the server C. Connect to the data warehouse database.

D. Retrieve a list of all model types from SpectroSERVER 704.

E. Retrieve a list of all model types from the database 203 via a database query.

F. Loop through the list of model types obtained from SpectroSERVER 704.
  I. If the current model type is instantiable then
    a. If the model type is not in the database then add it to a list G. If there are any new model types then
  I. Insert all the new model types into cs_model_type in one insert
  II. Execute the Extended Attribute Import on all new model types
  III. Execute the Attribute Import on all new model types H. Disconnects from the SpectroSERVER 704.

5. Attribute Import Flow

A. Connect to the SpectroSERVER using synchronous SSAPI.

B. Retrieve the VL Map from the SpectroSERVER 704 to obtain the landscape handle of the server.

C. Connect to the data warehouse database.

D. Retrieve a list of all attributes from the database and places them in a hash table.

E. Create a temporary table for Extended Attribute information.

F. Retrieve a list of all model types from SpectroSERVER 704.

G. Loop through list of model types from SpectroSERVER 704.
  I. If the current model type is instantiable then
    a. Retrieve the list of attributes for the current model type from the SpectroSERVER.
    b. Loop through the list of attributes
      i. Adds current attribute to unused table of attributes
      ii. If the current attribute is a new attribute, then
        1. Adds the current attribute to a list of new attributes
        2. Adds the model type to a list of model types to perform an extended attribute import on
      iii. If there are greater than or equal to 1000 new attributes then
        1. Insert the attributes into the database in one insert
        2. Empties out the new attribute list H. Insert the remaining new attributes into the database in one insert I. Insert the remaining updated attributes into the database in one insert J. Insert the remaining extended attributes into the database in one insert K. Execute the Extended Attribute Import on all the model types that had newly added attributes.
L. Disconnect from the SpectroSERVER 704.
6. Extended Attribute Import
   A. Connect to the data warehouse database 203.
   B. Loop through the list of model types/attribute ID pairs on which to perform an extended attribute import
      I. Request the attributes on the current model type
      II. Loop through the list of attributes
         a. If this attribute is the one from the model type/attribute ID pair then
            i. Add the attribute to a list
         b. If the list of attributes is greater than or equal to 1000 then
            i. Insert all the extended attributes into cs_mt_attr_link in one insert
            ii. Empty out the extended attribute list
   C. Insert the remaining extended attributes into cs_mt_attr_link in a database insert.
7. Association Import Flow
   A. Connect to the SpectroSERVER 704 using synchronous SSAPI.
   B. Retrieve the VL Map from the SpectroServer to obtain the landscape handle of the server.
   C. Connect to the database and truncates cs_temp_association.
   D. Retrieve relations from the SpectroSERVER.
   E. Loop through the relations:
      I. Retrieve all associations involved with the current relation
         a. Loop through the retrieved associations
            i. Add each association to a list
            ii. If there are greater than or equal to 1000 associations in the list then
               1. Insert all the associations into cs_temp_association in one insert
               2. Empty out the association list
   F. Insert the remaining associations into cs_temp_association in one insert
   G. In a database update, terminate all associations in cs_association that are now out of date
   H. In a database update, add all the new associations from cs_temp_assocation to cs_association performing the model mapping in the update.
   I. Disconnect from the SpectroSERVER.
8. Topology Import Flow (Topology Agent)
   A. Perform software/schema version check.
      II. Connect to the data warehouse database.
      III. Issue a query to the data warehouse database to retrieve the schema version.
      IV. Disconnect from the data warehouse database.
   B. Retrieve policy from the data warehouse database:
      I. Connects to the data warehouse database.
      II. A query is issued to the database (cs_agent_name) to retrieve the import agent data.
      III. A query is issued to the data warehouse database (cs_export_policy) to retrieve the policy specified on the command line.
      IV. The tables are joined internally to create a final detailed policy.
   C. Executes policy:
      I. Initialization:
         a. Connect and sends a log message to IoService indicating that the import has started:
            i. IoService performs a single insert into cs_log_message.
         b. Connect to the database.
         c. An update is issued to the database (cs_export_policy) to set the status field of the import to "running".
         d. Disconnect from the data warehouse database.
         e. Connect to the data warehouse database.
         f. An update is issued to the database (cs_export_policy) to set the start_time of the import to the current time.
         g. Disconnect from the data warehouse database.
      II. Run pre-scripts:
         a. Connect to the data warehouse database 203.
         b. Run a topo_fill_all_tables.sql script which fills tables with topology data:
            i. Open the script file.
            ii. Read a statement.
            iii. Send the statement to the database to be executed.
            iv. Loop until no more statements remain.
         c. Bind and execute the CS_SDW_UPDTOPO stored procedure.
      III. Run base import:
         a. Perform device import:
            i. Issue a query to retrieve a list of models from cs_device.
            ii. Create a unique temporary table name using the current time.
            iii. Register the temp table name by inserting it into cs_temp_table.
            iv. Issue a create table command to the database to create the temp table.
            v. Issue a create index command to the database to create indexes on the temp table.
            vi. Connect to the database (SSModelMap).
            vii. Loop through the list of models.
               1. Execute the CS_SS_MAP_GET_SS_MODEL stored procedure to convert the SDW model handle to a SPECTRUM model handle.
               2. If the landscape is different than the one already connected to then:
                  Disconnect from the old landscape.
                  Connect to the new landscape using synchronous SSAPI.
                  Retrieve the VL Map from the SpectroServer to obtain the landscape handle of the server.
               3. Requests the following attributes from the SpectroServer: Internal_Link_Status (0x10F1B), RPAdminStatus (0x11AC9), RPOperStatus (0x11AC8).
            viii. Disconnect from the current landscape.
            ix. Insert the retrieved attributes into the temp table in one insert.
            x. Run the topo_update_port_attribs.sql script:
               1. Open the script file.
               2. Read a statement.
               3. Send the statement to Oracle to be executed.
               4. Loop until no more statements remain.
            xi. Send a drop table command to the database to drop the temp table.
            xii. Unregister the temp table by deleting the entry in cs_temp_table.
         b. Perform interface import:
            i. Issue a query to retrieve a list of models from cs_interface.
            ii. Create a unique temporary table name using the current time.
            iii. Register the temp table name by inserting it into cs_temp_table.

iv. Issue a create table command to the database to create the temp table.
v. Issue a create index command to the database to create indexes on the temp table.
vi. Connect to the database (SSModelMap).
vii. Loop through the list of models.
  1. Execute the CS_SS_MAP_GET_SS_MODEL stored procedure to convert the SDW model handle to a SPECTRUM model handle.
  2. If the landscape is different than the one already connected to then:
     Disconnect from the old landscape.
     Connect to the new landscape using synchronous SSAPI.
     Retrieve the VL Map from the SpectroServer to obtain the landscape handle of the server.
  3. Request the following attributes from the SpectroSERVER: ifIndex (0x11348), ifDescr (0x1134B), Message_Size (0x1197B), ifType (0x1134C), ifSpeed (0x11IEE3), ifAdminStatus (0x10E3F), ifOperStatus (0x10E40), ip_address (0x10E43).
viii. Disconnect from the current landscape.
ix. Insert the retrieved attributes into the temp table in one insert.
x. Run the topo_update_if_attribs.sql script.
  1. Open the script file.
  2. Read a statement.
  3. Send the statement to Oracle to be executed.
  4. Loop until no more statements remain.
xi. Send a drop table command to the database to drop the temp table.
xii. Unregister the temp table by deleting the entry in cs_temp_table.
c. Perform port import:
  i. Issue a query to retrieve a list of models from cs_port.
  ii. Create a unique temporary table name using the current time.
  iii. Register the temp table name by inserting it into cs_temp_table.
  iv. Issue a create table command to the database to create the temp table.
  v. Issue a create index command to the database to create indexes on the temp table.
  vi. Connect to the database (SSModelMap).
  vii. Loop through the list of models.
    1. Execute the CS_SS_MAP_GET_SS_MODEL stored procedure to convert the SDW model handle to a SPECTRUM model handle.
    2. If the landscape is different than the one already connected to then:
       Disconnect from the old landscape.
       Connect to the new landscape using synchronous SSAPI.
       Retrieve the VL Map from the SpectroServer to obtain the landscape handle of the server.
    3. Request the following attributes from the SpectroServer: Internal_Link_Status (0x10F1B), RPAdminStatus (0x11AC9), RPOperStatus (0x11AC8).
  viii. Disconnects from the current landscape.
  ix. Insert the retrieved attributes into the temp table in one insert.
  x. Run the topo_update_port_attribs.sql script.
    1. Open the script file.
    2. Read a statement.
    3. Send the statement to Oracle to be executed.
    4. Loop until no more statements remain.
  xi. Send a drop table command to the database to drop the temp table.
  xii. Unregister the temp table by deleting the entry in cs_temp_table.
IV. Run post-scripts
  a. Bind and execute the CS_SDW_SPECTRUM_GROUPS stored procedure.
  b. Bind and execute the CS_SDW_RMON_GROUPS stored procedure.
D. Clean up
I. Connect to the data warehouse database.
II. Issued an update to the database (cs_export_policy) to set the status field of the import to "sleeping".
III. Disconnect from the data warehouse database.
IV. Connect to the data warehouse database.
V. Issued an update to the database (cs_export_policy) to set the cutoff time of the import to the current time.
VI. Disconnect from the database.
VII. Connect to the database.
VIII. Issue an update issued to the database (cs_export_policy) to set the end_time of the import to the current time.
IX. Disconnect from the database.
X. The agent connects and sends a log message to IoService indicating that the import has completed:
  a. IoService performs a single insert into cs_log_message.
XI. Disconnect from the database (PolicyMgr level connection).
XII. Disconnect from the database (TopoAgent level connection).

Below list pseudocode for importing events data from IACS agent 721:

9. IACSAgent Logic Flow (Import of Events Data)

```
Section: main
Entry point
---------------------------------------------------------------------
SDW DATABASE: check software, database schema versions;
if (version mismatch)
{
exit with error;
}
define policy for import;
processPolicy(policy);
exit;
---------------------------------------------------------------------
```

-continued

```
Section: processPolicy(policy)
Process an events import policy
------------------------------------------------------------------
SDW DATABASE: update status in CS_Export_Policy to RUNNING;
SDW DATABASE: write "Import Policy Triggered" log message
SDW DATABASE: connect to SDW database
SDW DATABASE: check for initial run condition
SDW DATABASE: disconnect from SDW database
if (this is an initial import run)
{
SDW DATABASE: drop all indexes (4) from CS_Event;
}
performImport(policy);
if (this is an initial import run)
{
SDW DATABASE: create all indexes for CS_Event;
}
SDW DATABASE: update status in CS_Export_Policy to SLEEPING or ERROR;
SDW DATABASE: write "Import Policy Completed" log message
exit;
------------------------------------------------------------------
Section: performImport(policy)
Perform the import
------------------------------------------------------------------
SDW DATABASE: update start time in CS_Export_Policy to current time;
SPECTRUM: connect to SpectroSERVER, using machine/port defined with policy;
get landscape handle from SpectroSERVER;
disconnect from SpectroSERVER;
determine time range for import;
for (each period (1 day or shorter) in time range)
{
start = start time of period;
end = end time of period;
importEvents(landscape_handle, start, end);
SDW DATABASE: update cutoff time in CS_Export_Policy = end;
}
exit;
------------------------------------------------------------------
Section: importEvents(landscape_handle, start, end)
Import events from landscape for given period
------------------------------------------------------------------
SPECTRUM: get events from landscape for time period (start, end), using
the form of CsDataDispatcherCollator::request_events() which requests
all events for all models in the given landscape. Results are written into
temp files stored in the working directory ./;
SDW DATABASE: connect to SDW database (connection for import operations)
for (each group of 1000 or less events extracted from temp files)
{
event_list = list of events;
SDW DATABASE: loadDatabase(event_list); -- Insert events into database
}
if (any events remain in event_list)
{
SDW DATABASE: loadDatabase(event_list); -- Insert events into database
}
SDW DATABASE: disconnect from SDW database
exit;
------------------------------------------------------------------
Section: loadDatabase(event_list)
Write events data to SDW database
------------------------------------------------------------------
initialize array of event rows to be inserted into database;
for (each event in event_list)
{
spectrum_model_handle - Spectrum model handle from event data;
time_stamp = time stamp from event data;
SDW DATABASE: model_handle mapToSDWModel(spectrum_model_handle,
time_stamp);
-- (map SPECTRUM model to internal SDW model)
construct new event row, add to event array;
}
SDW DATABASE: insert array into event table CS_Event, using
Oracle array insert (one insert command sent with array of row values,
normally of size 1000);
SDW DATABASE: commit the transaction;
exit;
------------------------------------------------------------------
```

-continued

```
Section: mapToSDWModel(spectrum_model_handle, time_stamp)
Map spectrum_model_handle to internal SDW model_handle
-----------------------------------------------------------------
if (spectrum_model_handle = last one encountered)
{
model_handle = last one determined;
}
else
{
SDW DATABASE: lock CS_Model to all other updates;
SDW DATABASE: search for CS_Model entry with given Spectrum model handle,
either active, or inactive with time_stamp within model start/end times
if (Spectrum model matches an inactive entry in SDW)
{
model is inactive - model_handle = existing SDW model key
}
else -- Spectrum model not found in SDW, or an active match is found
{
SPECTRUM: get model data from SpectroSERVER via a SSAPI call;
if (model is in SDW and is active)
{
if (model is not in SPECTRUM or
(model is in SPECTRUM but differs from that in SDW,
i.e. different model type or creation time))
{
SDW DATABASE: deactivate model in SDW
(i.e. update end_time key = now);
}
}
if (no active model in SDW and present in SPECTRUM)
{
SDW DATABASE: create model in SDW
(i.e. insert new CS_Model row with new SDW model key
and info just read via SSAPI);
model_handle = newly created SDW model key;
}
}
SDW DATABASE: unlock CS_Model;
}
return model_handle;
exit;
10. IACSAgent Logic Flow (Statistics Import)
Section: main
Entry point
-----------------------------------------------------------------
SDW DATABASE: check software, database schema versions;
if (version mismatch)
{
exit with error;
}
define policy for import;
processPolicy(policy);
exit;
-----------------------------------------------------------------
Section: processPolicy(policy)
Process a statistics import policy
-----------------------------------------------------------------
SDW DATABASE: update status in CS_Export_Policy to RUNNING;
SDW DATABASE: write "Import Policy Triggered" log message
SDW DATABASE: connect to SDW database
SDW DATABASE: check for initial run condition
SDW DATABASE: disconnect from SDW database
if (this is an initial import run)
{
SDW DATABASE: drop time key index for CS_Statistic;
}
performImport(policy);
if (this is an initial import run)
{
SDW DATABASE: create time key index for CS_Statistic;
}
```

-continued

```
SDW DATABASE: update status in CS_Export_Policy to SLEEPING or ERROR;
SDW DATABASE: write "Import Policy Completed" log message
exit;
------------------------------------------------------------------
Section: performImport(policy)
Perform the import
------------------------------------------------------------------
SDW DATABASE: update start time in CS Export Policy to current time;
SPECTRUM: connect to SpectroSERVER, using machine/port defined with policy;
get landscape handle from SpectroSERVER;
disconnect from SpectroSERVER;
SDW DATABASE: connect to SDW database;
SDW DATABASE: get aggregation period (normally 3600) from CS_Parameter;
SDW DATABASE: disconnect from SDW database;
determine time range for import;
for (each period (1 day or shorter) in time range)
{
start = start time of period;
end = end time of period;
importStatistics(landscape_handle, start, end);
SDW DATABASE: update cutoff time in CS_Export_Policy = end;
}
exit;
------------------------------------------------------------------
Section: importStatistics(landscape_handle, start, end)
Import statistics from landscape for given period
------------------------------------------------------------------
SPECTRUM: get compressed statistics for all logged attributes in landscape,
for time period (start, end), using the form of
CsDataDispatcherCollator::request_data() which requests all statistics
for all models in a given landscape logged within the given time range.
Results are written into temp files stored in the working directory ./;
SDW DATABASE: connect to SDW database (connection for import operations)
for (each model/attribute returned from DAS)
{
spectrum_model_handle = Spectrum model handle from returned data;
time_stamp = first time value from returned data;
SDW DATABASE: model_handle = mapToSDWModel(spectrum_model_handle,
time_stamp);
-- (map SPECTRUM model to internal SDW model)
data_list = uncompressed time/value list for model/attribute;
prepare aggregation_list: scan data_list calculating base level (1 hour)
statistic entries for insertion into database;
if (number of aggregation_list entries >= 1000)
{
SDW DATABASE: loadDatabase(aggregation_list); -- Transfer to database
}
}
if (aggregation_list not empty)
{
SDW DATABASE: loadDatabase(aggregation_list); -- Transfer to database
}
SDW DATABASE: disconnect from SDW database
exit;
------------------------------------------------------------------
Section: mapToSDWModel(spectrum_model_handle, time_stamp)
Map spectrum_model_handle to internal SDW model_handle
------------------------------------------------------------------
if (spectrum_model_handle = last one encountered)
{
model_handle = last one determined;
}
else
{
SDW DATABASE: lock CS_Model to all other updates;
SDW DATABASE: search for CS_Model entry with given Spectrum model handle,
either active, or inactive with time stamp within model start/end times
if (Spectrum model matches an inactive entry in SDW)
{
model is inactive - model_handle = existing SDW model key
}
else -- Spectrum model not found in SDW, or an active match is found
{
SPECTRUM: get model data from SpectroSERVER via a SSAPI call;
if (model is in SDW and is active)
{
if (model is not in SPECTRUM or
(model is in SPECTRUM but differs from that in SDW,
i.e. different model type or creation time))
```

-continued

```
{
SDW DATABASE: deactivate model in SDW
(i.e. update end_time_key = now);
}
}
if (no active model in SDW and present in SPECTRUM)
{
SDW DATABASE: create model in SDW
(i.e. insert new CS_Model row with new SDW model key
and info just read via SSAPI);
model_handle = newly created SDW model key;
}
}
SDW DATABASE: unlock CS_Model;
}
return model_handle;
exit;
------------------------------------------------------------------
Section: loadDatabase(aggregation_list)
Write statistics data to SDW database
------------------------------------------------------------------
```

Figure 9:
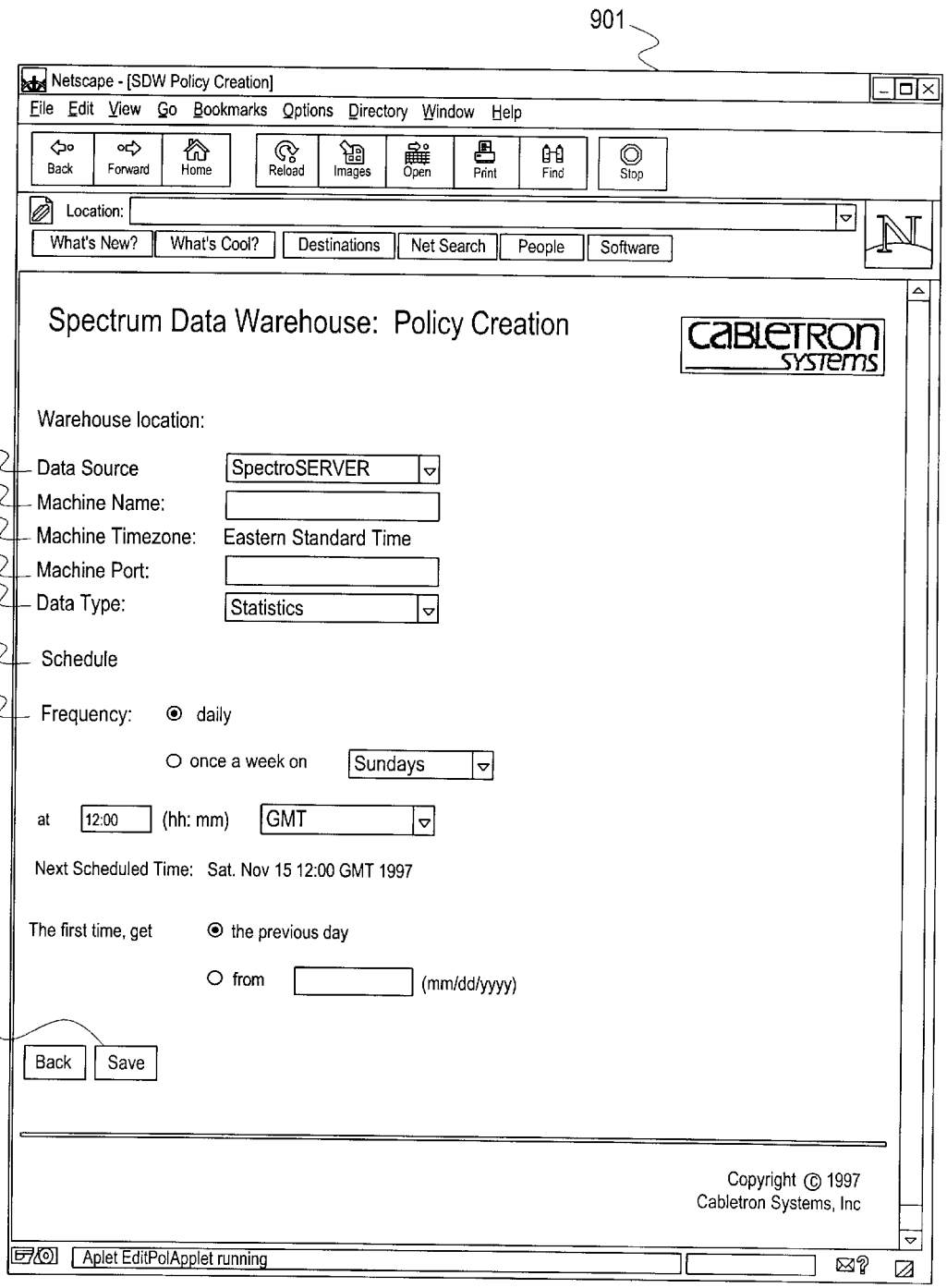
FIG. 9 is a representation of a graphical user interface for managing policies.

Prepare array of CS_Statistic rows from aggregation_list;
SDW DATABASE: insert array into work table CS_Statistic_T0, using Oracle array insert (one insert command sent with array of row values, normally of size 1000);
SDW DATABASE: call stored procedure CS_SDW_UPDATE_STAT, which processes the data just inserted into the work table:
start a database transaction;
delete any rows from the work table which already exist in CS_Statistic;
insert all rows from work table into CS_Statistic;
call stored procedure CS_SDW_UPDATE_STAT_AGG, which updates currently defined aggregation tables with data from work table;
commit the transaction;
exit;

FIG. 9 is a representation of a graphical user interface for managing policies. In particular, FIG. 9 shows a user interface screen 901 for allowing a network administrator to create policies for importing data into data warehouse 203. Interface 901 allows an administrator to specify a data source 902, which, in accordance with one embodiment, is a network management server such as a SpectroSERVER network management system. Interface 901 also allows an administrator to specify a machine name 903 which identifies the network management system's logical name. Also, a timezone 904 for the management server may be specified such that data may be collected at a specified time at the management system. Machine port 905 allows the administrator to specify a port of the management server through which data will be transmitted. Data type 906 field allows an administrator to specify what types of data will be collected from the management system. Interface 901 also allows an administrator to specify a frequency schedule at which data will be transferred to data warehouse 203. By selecting button 909, an administrator may save the policy information in database policies 209 (see FIG. 2).

Figure 10:
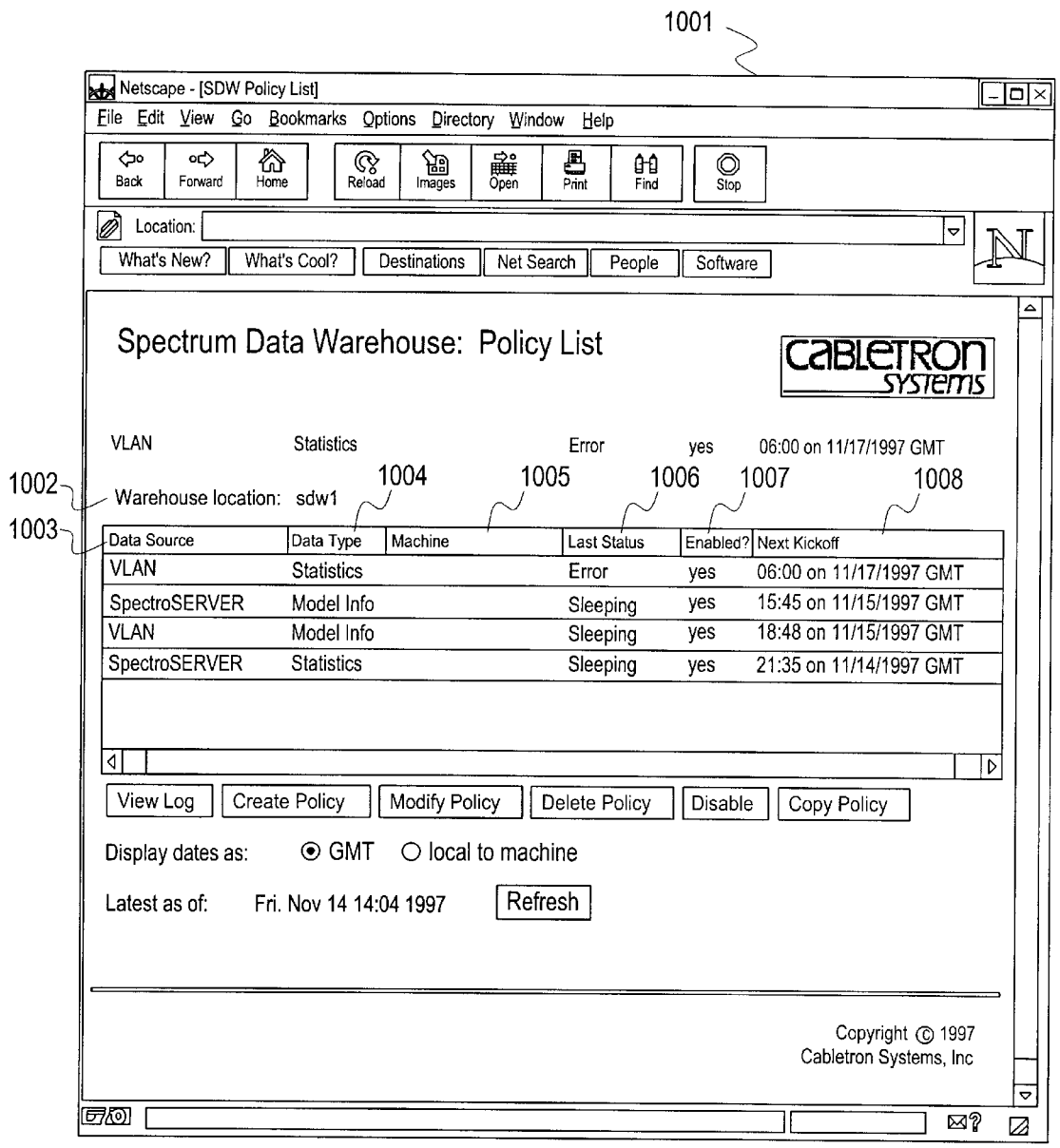
FIG. 10 is a representation of a graphical user interface for listing information regarding created policies.

FIG. 10 is a representation of a graphical user interface for listing information regarding created policies. Specifically, FIG. 10 shows a user interface screen 1001 that accepts input and displays information to an administrator regarding policies in database policies 209. Warehouse location 1002 indicates for which data warehouse the created policies apply. Data source 1003 indicates the data source from which the data is obtained. Data type 1004 indicates a type of data that is collected from the management system. Machine 1005 indicates a machine name 903 which identifies the network management system's logical name. Last status 1006 indicates the last status of a policy that was executed by data management system 210. Status 1006 may indicate, for example, whether the execution was successful, is currently in progress, or is currently in an idle or sleep mode. Enabled status 1007 indicates whether the policy is enabled (policies can be enabled or disabled by the administrator). Field 1008 indicates when the next execution of the policy will occur.

Figure 11:
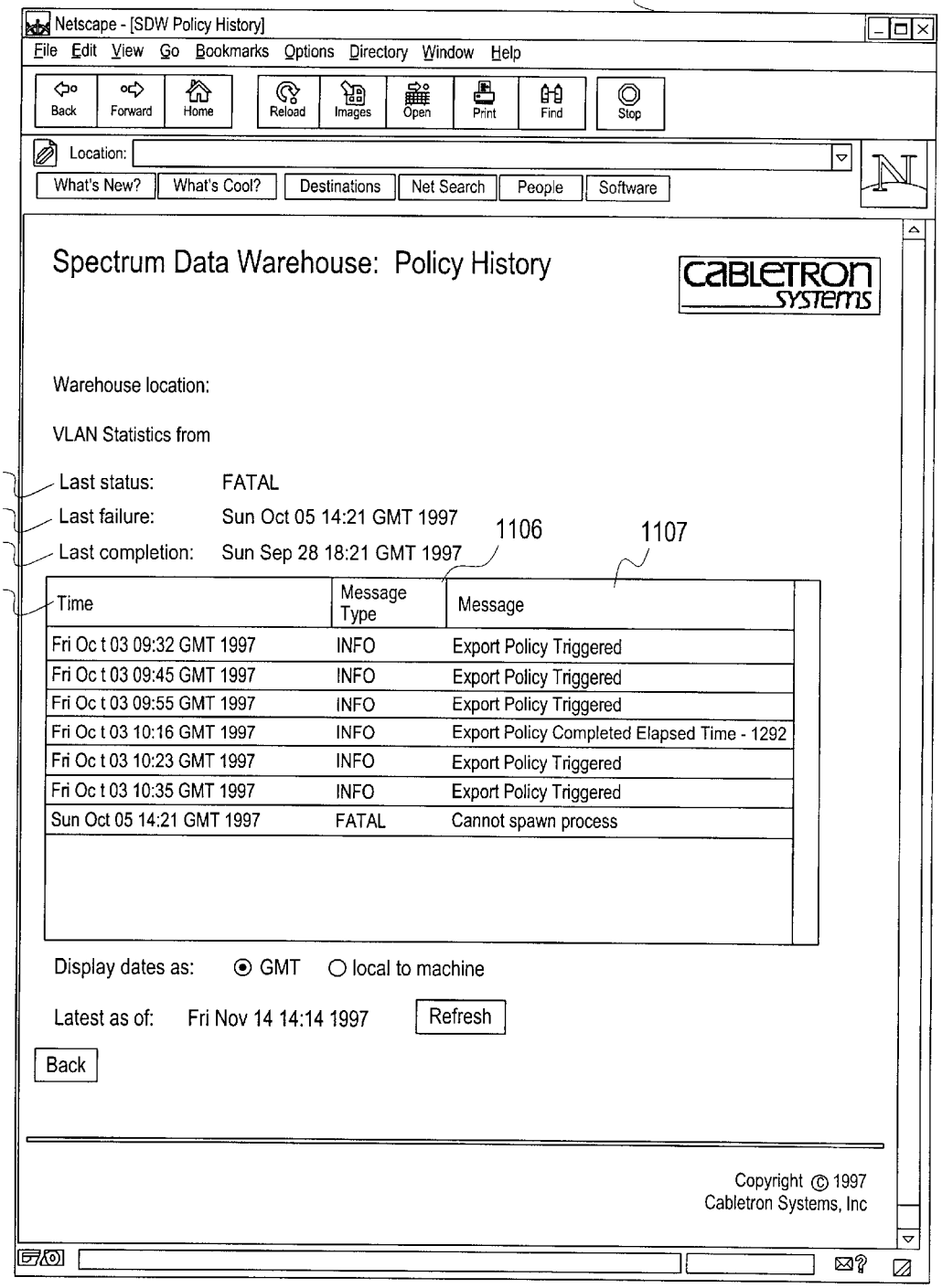
FIG. 11 is a representation of a graphical user interface for listing history information regarding created policies.

FIG. 11 is a representation of a graphical user interface for listing history information regarding created policies. In particular, interface 1101 shows a policy history to an administrator. History information may be stored by data management system 210 in its own database or within data warehouse 203. Field 1102 shows the last status of a policy execution, whereby system 210 could indicate whether or not the execution of the policy was successful or an error occurred. Field 1103 indicates the last failure of the policy execution. Field 1104 indicates the last time the policy successfully completed an execution. Interface 1101 lists, in a table or other type of indication to the user, a list of history items corresponding to actions regarding a particular policy. Field time 1105 indicates the time at which the history entry occurred. Message type 1106 indicates the type of message entered in the history list. Message type 1106 may indicate whether the message was a fatal error, merely informational, or other information associated with a corresponding list entry. Message field 1107 indicates an action performed by system 210, an error encountered, or other information related to a history list entry.

Figure 12:
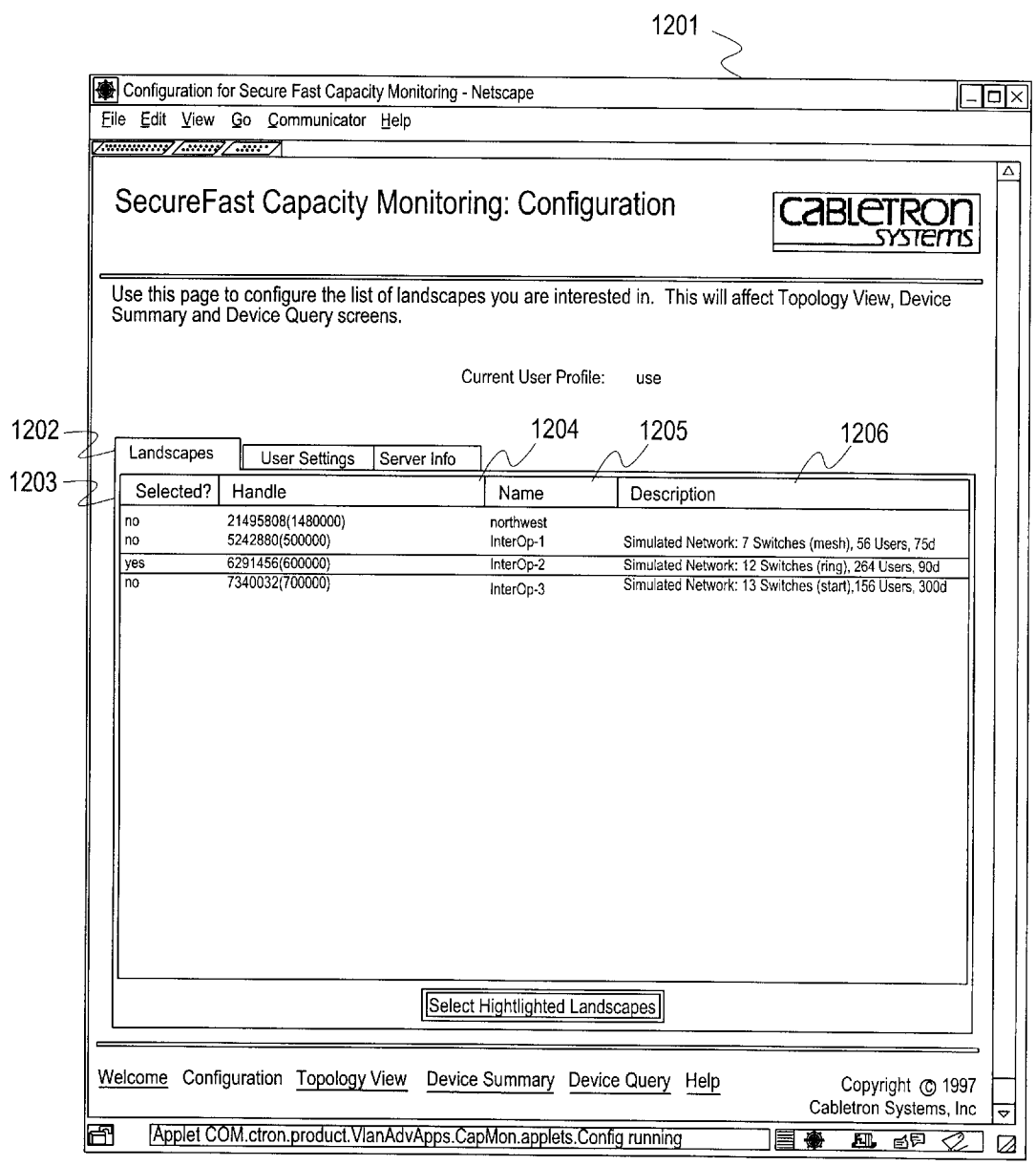
FIG. 12 is a representation of a graphical user interface for configuring network monitoring.

FIG. 12 is a representation of a graphical user interface for configuring network monitoring. For example, a graphical user interface may be provided to an administrator for configuring network monitoring on one or more management systems such as a SecureFast VLAN or Flow Admission Server (FAS), and SecureFast Virtual Remote Access (VRA) to provide information for an application 202 such as capacity planning and monitoring. View 1202 shows the landscapes available to be monitored. Selected field 1203 indicates one or more landscapes that may be selected. Handle 1204 indicates a database handle of the landscape such that the landscape may be located in data warehouse 203. Name field 1205 indicates a logical name of a landscape. Description field 1206 indicates a description of the landscape. The description may describe attributes of the landscape network, such as the size, number of users, types of network media, and the like.

Figure 13:
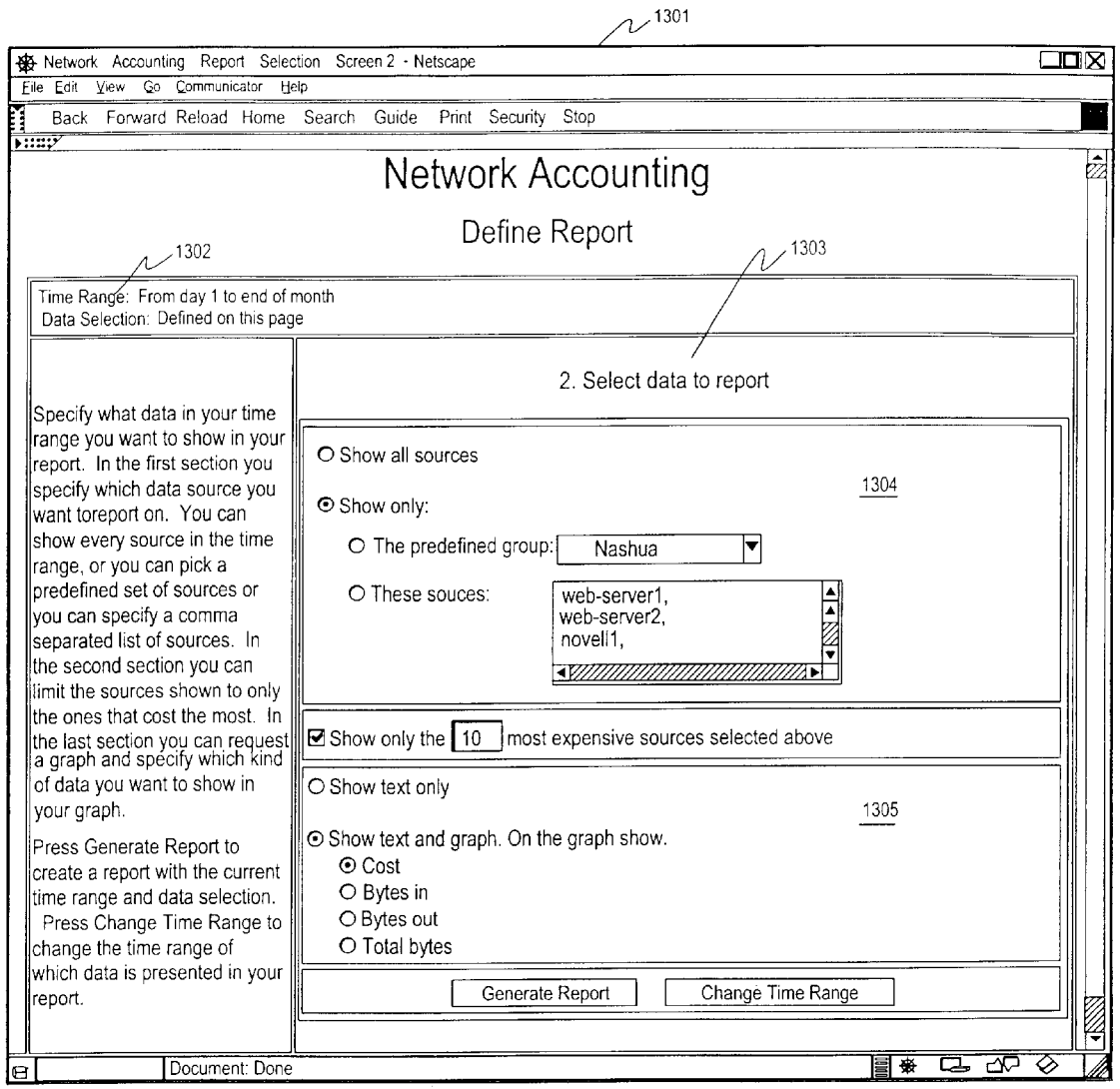
FIG. 13 is a representation of a graphical user interface for configuring a network accounting report.

FIG. 13 is a representation of a graphical user interface for configuring a network accounting report. As discussed above, an administrator may wish to obtain graphical reports regarding a high-level application, such as network accounting or capacity management. By way of example, interface 1301 is presented to an administrator for defining a network accounting report. Data warehouse 203 is accessed based upon report parameters supplied in interface 1301. Accounting may be performed based on a specified time period, data sources, group of sources, or parameters such as cost or bytes. A graphical or textual type report may be produced based on the report parameters provided in area 1305.

Figure 14:
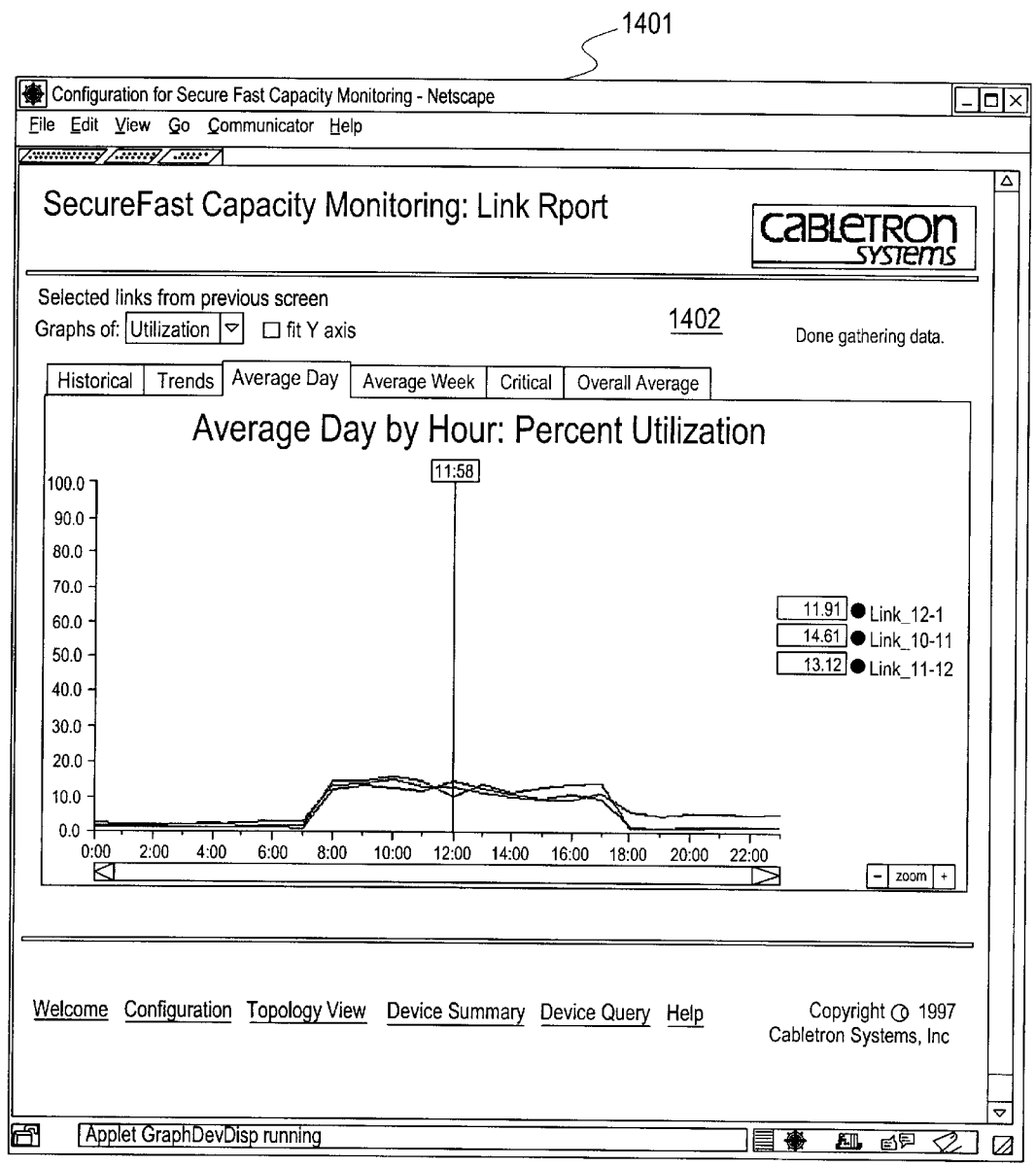
FIG. 14 is a representation of a graphical user interface for configuring a network link report.

FIG. 14 is a representation of a graphical user interface for configuring a network link report. As discussed above, information stored from various data sources may be accessed by an application 202. For example, information may be collected from multiple network domains by multiple network management systems. This information may be consolidated or combined in data warehouse 203. Interface 1401 accepts parameters from a user to present to the user utilization statistics based on links in the network. In particular, system 203 may show a graph 1402 to an administrator to show the percent utilization for links of systems based on a specified time period. Also, the graph 1402 may be based on the number of bytes, packets, or other parameter used to show capacity of a communication link.

The graphical user interfaces described above are merely examples of presenting data to an administrator, and the invention is not limited to the embodiments described herein. Other interfaces may be used, including terminal-based interfaces, X-window interfaces, those available through operating systems such as Windows 98, Windows 2000, and Windows NT, and the like.

While various embodiments of the present invention have been described above, it should be understood that they have been presented by way of example only, and not limitation. Thus, the breadth and scope of the present invention are not limited by any of the above exemplary embodiments, but are defined only in accordance with the following claims and their equivalents.

What is claimed is:

1. A system for consolidating information generated by a plurality of management systems, at least one of the plurality of management systems is a network management system for managing at least one network device having a network address, the system comprising:
   a data manager that receives data from the plurality of management systems including the network management system managing the network device and consolidates the data into a data warehouse, the data manager comprising:
      an interface for receiving the data from each of the plurality of management systems including the network management system; and
      a database accessor responsive to the interface to store the data received from each of the plurality of management systems including the network management system in the data warehouse to create a repository of consolidated data from the plurality of management systems including the network management systems managing the network device, the repository providing consolidated data to an application executing on an electronic device.

2. The system according to claim 1, wherein the interface includes a component for receiving the data from each of the plurality of management systems and for filtering the data received from more than one source.

3. The system according to claim 1, wherein at least one of the plurality of management systems is a network management system.

4. The system according to claim 1, wherein the database accessor utilizes a standard database interface to one or more proprietary data warehouses.

5. The system according to claim 1, wherein the interface includes a component that is configured to push data to the database accessor at a specified interval.

6. The system according to claim 1, wherein the interface includes a component that is configured to poll one or more systems for obtaining data and provides the data to the database accessor.

7. The system according to claim 6, wherein the one or more systems are network management systems.

8. The system according to claim 7, wherein the network management systems store different types of management information.

9. A method performed in an electronic device for consolidating information generated by a plurality of management systems, at least one of the plurality of management systems is a network management system for managing at least one network entity addressable by a network, the method comprising steps of:
   receiving data from at least the network management system for managing the network entity addressable by the network;
   determining a proper format for the data received from the network management system for managing the network entity addressable by the network and from the data received from each of the plurality of management systems, the format being suitable for a selected data warehouse; and
   storing the properly formatted data in the data warehouse to provide a repository of consolidated data from the plurality of management systems and the network management system accessible to an application operating on an electronic device.

10. The method according to claim 9, further comprising a step of deleting duplicate data received from more than one management system.

11. The method according to claim 9, wherein at least one of the plurality of management systems is a network management system.

12. The method according to claim 9, wherein the method further comprises the step of using a standard database interface to access the data warehouse.

13. The method according to claim 9, further comprising a step of pushing data for storage in the data warehouse at a specified interval.

14. The method according to claim 9, further comprising a step of polling at least one of the plurality of management systems to obtain management information and providing the management information for storage in the data warehouse.

15. The method according to claim 14, wherein the one or more systems are network management systems.

16. The method according to claim 15, wherein the network management systems store different types of management information.

17. A computer program product comprising a computer-readable medium having computer logic recorded thereon for enabling a processor in a computer system to manage information generated by a plurality of network management systems managing a plurality of network entities addressable by a network, the computer program being adapted to cause the computer system to perform the steps of:

accepting information from each of the plurality of network management systems managing the plurality network entities addressable by a network;

accessing a data warehouse to store the accepted information; and storing the accepted information in the data warehouse to maintain a repository of consolidated information accessible to an electronic device executing a program for processing the accepted information.

18. An apparatus for storing information collected by one or more network management systems, each of the one or more network management systems manage at least one network device associated with a medium access control (MAC) address, the apparatus comprising:

a data manager responsive to each of the network management systems for managing the storing and consolidating of the information collected from each of the network devices associated with the MAC address by the one or more network management systems in a data warehouse, said data manager comprising;

a storage manager for interfacing with the data warehouse and for passing the information collected from each of the network devices associated with the MAC address by the one or more network management systems to the data warehouse for storage; and an interface for receiving and consolidating the information collected from each of the network devices associated with the MAC address by each of the network management systems and passing the information to the storage manager, the interface further providing an application executing on an electronic device access the information collected.

19. The apparatus according to claim 18, wherein the interface includes a component for allowing each of the network management systems to push the information to the data manager.

20. The apparatus according to claim 18, wherein the interface includes a component for polling each of the network management systems to request the each of the network management systems to pass the collected information that is suitable for storage in the data warehouse.

21. The apparatus according to claim 18, wherein the interface includes a component that is configured to push data to the storage manager at a specified interval.

22. The apparatus according to claim 18, wherein the data manager is capable of filtering the information received from each of the network management systems to remove duplicative information.

23. In an electronic device, a method for storing data collected by one or more network management systems that manage one or more network entities addressable by a network, the method, comprising the steps of:

receiving data collected by at least one of the network management systems from one of the network entities addressable by a network for consolidation into a data warehouse;

processing the received data collected from the network entity to remove at least redundant data; and storing the processed data in the storage warehouse to provide a consolidated and filtered repository of data collected from the one or more network entities addressable by a network, the repository being accessible by an electronic device executing a program for further manipulation of the consolidated and filtered data.

24. The method according to claim 23, further comprising the step of, polling at least one of the network management systems for the data collected.

25. The method according to claim 23, further comprising the step of, pushing a portion of the processed data to the storage warehouse.

26. The method according to claim 23, wherein the interface includes a component that is configured to push data to the storage manager at a specified interval.

27. The method according to claim 23, further comprising the step of, compressing the processed data.

28. The method according to claim 23, wherein the network entity comprises a switch.

* * * * *